(12) United States Patent
Sun et al.

(10) Patent No.: US 12,634,928 B2
(45) Date of Patent: May 19, 2026

(54) PUSCH TRANSMISSION METHOD AND APPARATUS, DEVICE, AND STORAGE MEDIUM

(71) Applicant: VIVO MOBILE COMMUNICATION CO., LTD., Guangdong (CN)

(72) Inventors: Rongrong Sun, Guangdong (CN); Peng Sun, Guangdong (CN); Hao Liu, Guangdong (CN); Yuan Shi, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 206 days.

(21) Appl. No.: 18/351,050

(22) Filed: Jul. 12, 2023

(65) Prior Publication Data

US 2023/0362927 A1 Nov. 9, 2023

Related U.S. Application Data

(63) Continuation of application No. PCT/CN2022/072140, filed on Jan. 14, 2022.

(30) Foreign Application Priority Data

Jan. 15, 2021 (CN) .......................... 202110057894.8

(51) Int. Cl.
*H04W 4/00* (2018.01)
*H04L 5/00* (2006.01)
(Continued)

(52) U.S. Cl.
CPC ....... *H04W 72/1268* (2013.01); *H04L 5/0048* (2013.01); *H04W 72/23* (2023.01)

(58) Field of Classification Search
CPC ... H04W 28/04; H04W 72/04; H04W 72/042; H04W 88/08; H04W 28/08;
(Continued)

(56) References Cited

U.S. PATENT DOCUMENTS 11,044,062 B2 * 6/2021 Zhang .................. H04B 7/0689
11,362,787 B2 * 6/2022 Xi .......................... H04L 5/0007
(Continued)

FOREIGN PATENT DOCUMENTS

| CN | 109565855 A | 4/2019 |
|---|---|---|
| CN | 110351037 A | 10/2019 |

(Continued)

OTHER PUBLICATIONS

Keysight Technologies UK, "NR5GC FR1: Addition of NR MAC test case 7.1.1.4.2.3", 3GPP TSG-RAN5 Meeting #2020-TTCN email, R5s200481, Online, Dec. 16, 2019-Dec. 31, 2020.
(Continued)

*Primary Examiner* — Phuongchau Ba Nguyen
(74) *Attorney, Agent, or Firm* — Price Heneveld LLP

(57) ABSTRACT

A PUSCH transmission method and apparatus, a device, and a storage medium are disclosed. The method includes: determining, by a terminal based on first indication information that is received, a target transmission resource configuration from at least one transmission resource configuration; and performing PUSCH transmission based on the target transmission resource configuration; where the first indication information includes at least one of the following: SRS resource indication information; TPMI indication information; and PTRS transmit port indication information.

20 Claims, 4 Drawing Sheets

A terminal determines, based on first indication information that is received, a target transmission resource configuration indicated by the first indication information — 200

Perform PUSCH transmission based on the target transmission resource configuration — 210

(51) Int. Cl.
    *H04W 72/1268*        (2023.01)
    *H04W 72/23*          (2023.01)
(58) Field of Classification Search
    CPC ... H04W 28/084; H04W 36/22; H04W 72/12;
          H04W 72/1268; H04W 72/23; H04W
          72/232; H04L 5/0007; H04L 5/0048;
          H04L 5/0053; H04L 5/0023; H04L
          5/0044; H04L 5/0051; H04L 5/0094;
                    H04B 7/0456; H04B 7/0639
    See application file for complete search history.

(56)                References Cited

U.S. PATENT DOCUMENTS

| | | | | |
|---|---|---|---|---|
| 11,611,953 | B2 * | 3/2023 | Wang | H04W 52/42 |
| 11,729,782 | B2 * | 8/2023 | Zhang | H04W 72/23 |
| | | | | 370/336 |
| 2019/0149299 | A1 * | 5/2019 | Lee | H04L 5/0092 |
| | | | | 370/329 |
| 2020/0412503 | A1 * | 12/2020 | Huang | H04L 5/0091 |
| 2021/0044467 | A1 | 2/2021 | Xi et al. | |
| 2022/0224471 | A1 * | 7/2022 | Kim | H04B 7/063 |
| 2022/0330221 | A1 | 10/2022 | Pan et al. | |
| 2022/0345195 | A1 * | 10/2022 | Jang | H04B 7/0695 |
| 2023/0371042 | A1 * | 11/2023 | Mei | H04L 5/0048 |
| 2024/0275556 | A1 * | 8/2024 | Chen | H04W 72/232 |
| 2025/0350327 | A1 * | 11/2025 | Lim | H04L 5/0048 |

FOREIGN PATENT DOCUMENTS

| | | | |
|---|---|---|---|
| CN | 110536452 | A | 12/2019 |
| WO | 2019174512 | A1 | 9/2019 |
| WO | 2019192448 | A1 | 10/2019 |
| WO | 2020165413 | A1 | 8/2020 |

OTHER PUBLICATIONS

Nokia, "Introduction of NR URLLC support", 3GPP TSG-RAN WG1 Meeting #99, R1-1913650, Reno, USA Nov. 18-22, 2019.
"3rd Generation Partnership Project; Technical Specification Group Radio Access Network; NR; Multiplexing and channel coding (Release 16)", 3GPP TS 38.212 V16.4.0 (Dec. 2020), Valbonne—France.
Vivo, "Further discussion on enhancement of MTRP operation", 3GPP TSG RAN WG1 #103-e, R1-2007645, e-Meeting, Oct. 26-Nov. 13, 2020.
ZTE, "Further details on Multi-beam and Multi-TRP operation", 3GPP TSG RAN WG1 Meeting #103-e, R1-2007770, e-Meeting, Oct. 26-Nov. 13, 2020.
First Indian Office Action for Indian Patent Application No. 202317046628 mailed Mar. 30, 2026, 7 pages.
Keysign Technologies UK, Huawei. Hisilicon, "Correction to NR MAC test case 7.1.1.4.2.3", 3GPP TSG-RAN5 Meeting #87-e, R5-202608, Electronic Meeting, May 18-29, 2020.

* cited by examiner

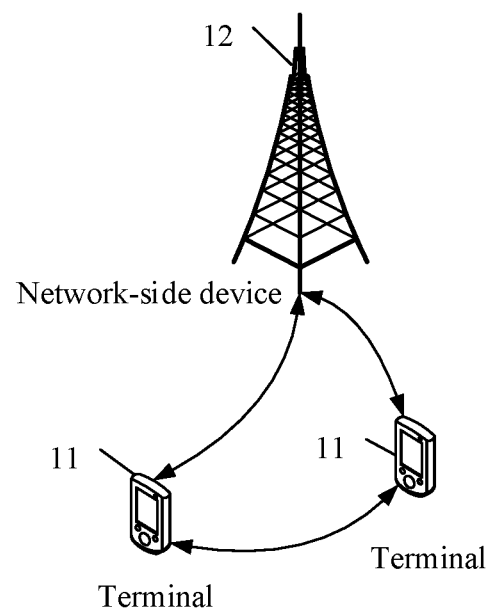
FIG. 1
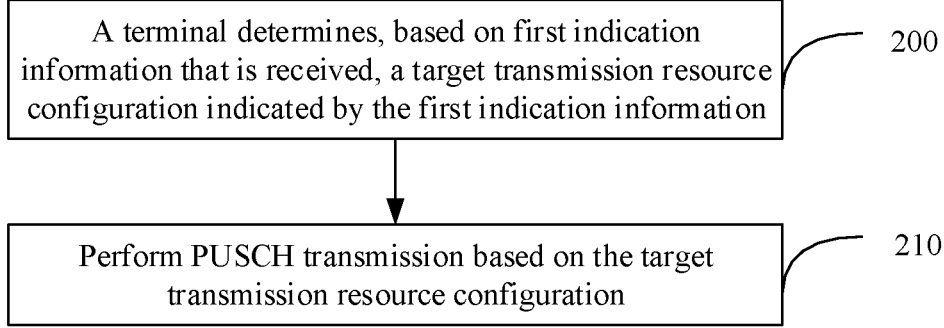
FIG. 2
FIG. 3

PUSCH TRANSMISSION METHOD AND APPARATUS, DEVICE, AND STORAGE MEDIUM

CROSS-REFERENCE TO RELATED APPLICATIONS

This application is a continuation application of PCT International Application No. PCT/CN2022/072140 filed on Jan. 14, 2022, which claims priority to Chinese Patent Application No. 202110057894.8, filed in China on Jan. 15, 2021, which are incorporated herein by reference in their entireties.

TECHNICAL FIELD

This application pertains to the field of communications technologies, and specifically relates to a PUSCH transmission method and apparatus, a device, and a storage medium.

BACKGROUND

In a multiple transmit and receive point (MTRP) scenario, physical uplink shared channel (PUSCH) transmission may use at least one spatial relation and at least one transmitted precoding matrix indicator (TPMI).

In the prior art, a maximum of two spatial relations are used to support PUSCH repetition, and two sets of parameters are also required for corresponding TPMIs. In the MTRP scenario, a maximum of two SRS resource sets may be configured for codebook-based or non-codebook-based transmission. For a corresponding SRI field and TPMI field in downlink control information (DCI) for scheduling PUSCH, the number of bits needs to be doubled on the original basis to indicate the corresponding two sets of parameters, resulting in extremely large DCI overheads.

SUMMARY

According to a first aspect, a PUSCH transmission method is provided, and the method includes:
  determining, by a terminal based on first indication information that is received, a target transmission resource configuration indicated by the first indication information from at least one transmission resource configuration; and
  performing PUSCH transmission based on the target transmission resource configuration; where
  the first indication information includes at least one of the following:
  sounding reference signal (SRS) resource indication information;
  precoding matrix indicator TPMI indication information; and
  phase tracking reference signal PTRS transmit port indication information.

According to a second aspect, a PUSCH transmission method is provided, and the method includes:
  sending, by a network side, first indication information to a terminal; where
  the first indication information is used to instruct the terminal to determine a target transmission resource configuration indicated by the first indication information from at least one transmission resource configuration; and
  the first indication information includes at least one of the following:

sounding reference signal SRS resource indication information;
  precoding matrix indicator TPMI indication information; and phase tracking reference signal PTRS transmit port indication information.

According to a third aspect, a PUSCH transmission apparatus is provided, and the apparatus includes:
  a first determining module, configured to determine, based on first indication information that is received, a target transmission resource configuration indicated by the first indication information from at least one transmission resource configuration; and
  a first transmission module, configured to perform PUSCH transmission based on the target transmission resource configuration; where
  the first indication information includes at least one of the following:
  sounding reference signal SRS resource indication information;
  precoding matrix indicator TPMI indication information; and
  phase tracking reference signal PTRS transmit port indication information.

According to a fourth aspect, a PUSCH transmission apparatus is provided, and the apparatus includes:
  a first sending module, configured to send first indication information to a terminal; where
  the first indication information is used to instruct the terminal to determine a target transmission resource configuration indicated by the first indication information from at least one transmission resource configuration; and
  the first indication information includes at least one of the following:
  sounding reference signal SRS resource indication information;
  precoding matrix indicator TPMI indication information; and
  phase tracking reference signal PTRS transmit port indication information.

According to a fifth aspect, a terminal device is provided, where the terminal device includes a processor, a memory, and a program or instructions stored in the memory and capable of running on the processor, and when the program or the instructions are executed by the processor, the steps of the method according to the first aspect are implemented.

According to a sixth aspect, a network-side device is provided, where the network-side device includes a processor, a memory, and a program or instructions stored in the memory and capable of running on the processor, and when the program or the instructions are executed by the processor, the steps of the method according to the second aspect are implemented.

According to a seventh aspect, a readable storage medium is provided, where a program or instructions are stored in the readable storage medium, and when the program or the instructions are executed by a processor, the steps of the method according to the first aspect are implemented, or the steps of the method according to the second aspect are implemented.

According to an eighth aspect, a chip is provided, where the chip includes a processor and a communications interface, the communications interface is coupled to the processor, and the processor is configured to run a program or instructions on the device to implement the method according to the first aspect or the method according to the second aspect.

BRIEF DESCRIPTION OF DRAWINGS

FIG. 1 is a block diagram of a wireless communications system to which the embodiments of this application are applicable;

FIG. 2 is a first schematic flowchart of a PUSCH transmission method according to an embodiment of this application;

FIG. 3 is a second schematic flowchart of a PUSCH transmission method according to an embodiment of this application;

DETAILED DESCRIPTION OF EMBODIMENTS

Figure 4:
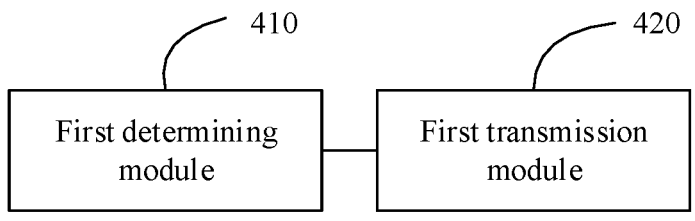
FIG. 4 is a first schematic flowchart of a PUSCH transmission apparatus according to an embodiment of this application.

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

In the specification and claims of this application, the terms such as "first" and "second" are intended to distinguish between similar objects but do not necessarily indicate a specific order or sequence. It should be understood that the data used in this way is interchangeable in appropriate circumstances so that the embodiments of this application can be implemented in other orders than the order illustrated or described herein, and "first" and "second" are usually for distinguishing same-type objects but not limiting the number of objects, for example, there may be one or more first objects. In addition, in the specification and claims, "and/or" represents presence of at least one of connected objects, and the symbol "/" in this specification usually indicates an "or" relationship between associated objects.

It should be noted that techniques described in the embodiments of this application are not limited to a long term evolution (LTE) or LTE-Advanced (LTE-A) system, and may also be applied to various wireless communications systems, for example, code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. Techniques described herein may be used in the aforementioned systems and radio technologies, and may also be used in other systems and radio technologies. In the following descriptions, a new radio (NR) system is described for an illustration purpose, and NR terms are used in most of the following descriptions, although these technologies may also be applied to other applications than an NR system application, for example, the 6th generation (6th Generation, 6G) communications system.

FIG. 1 is a block diagram of a wireless communications system to which the embodiments of this application are applicable. The wireless communications system includes a terminal 11 and a network-side device 12. The terminal 11 may also be referred to as a terminal device or user equipment (UE), and the terminal 11 may be a terminal-side device, such as a mobile phone, a tablet computer (Tablet Personal Computer), a laptop computer or a notebook computer, a personal digital assistant (PPDA), a palmtop computer, a netbook, an ultra-mobile personal computer (UMPC), a mobile Internet device (MID), a wearable device or vehicle user equipment (VUE), or pedestrian user equipment (PUE). The wearable device includes: a wrist band, earphones, glasses, or the like. It should be noted that a specific type of the terminal 11 is not limited in the embodiments of this application. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmission and reception Point (Transmitting Receiving Point, TRP), or another appropriate term in the art. Provided that a same technical effect is achieved, the base station is not limited to a specific technical term. It should be noted that in the embodiments of this application, the base station in the NR system is merely used as an example, and a specific type of the base station is not limited.

In the multi-TRP/multi-panel (multi-TRP/multi-panel) scenarios in communication systems, transmission reliability and throughput performance can be increased. In downlink, the UE can receive same or different data from multiple TRPs. In uplink, the UE can send different data to multiple TRPs. The network side may associate multiple CORESETs configured by the UE with different RRC parameters CORESETPoolIndex, corresponding to different TRPs. Each TRP schedules its own uplink transmission PUSCH by sending its own DCI, that is, in the multi-TRP scenario, PUSCH transmission is scheduled by using multi-DCI. The communication system further performs PUSCH enhancement under the MTRP, and the UE may send same data to two TRPs.

In the MTRP scenario, one transport block (TB) of PUSCH can be repeatedly sent to multiple TRPs. PUSCH repetition uses multiple sets of parameters for different TRPs, including spatial relation, precoding matrix, power control, and the like. In the prior art, a maximum of two spatial relations are used to support PUSCH repetition, and two sets of parameters are required for corresponding TPMIs. In the MTRP scenario, a maximum of two SRS resource sets may be configured for codebook-based or non-codebook-based transmission. For a corresponding SRI field and TPMI field in DCI for scheduling PUSCH, the number of bits needs to be doubled on the original basis to indicate corresponding two sets of parameters.

In uplink full-power transmission, a maximum of four SRS resources can be configured in each SRS resource set, and multiple TPMIs for indicating full power transmission codebooks can also be introduced. However, bit overheads for the SRI field and the TPMI field are very large. If the existing solution continues to be used, bit overheads for the SRI field and the TPMI field are directly doubled and become extremely large. In addition, in the MTRP scenario, PUSCH repetition oriented to more TRPs may be supported, and therefore the existing solution is no longer applicable in this case.

In order to overcome the foregoing disadvantages, this application provides a PUSCH transmission method and apparatus.

The following describes in detail the PUSCH transmission method provided in the embodiments of this application by using specific embodiments and application scenarios thereof with reference to the accompanying drawings.

FIG. 2 is a first schematic flowchart of a PUSCH transmission method according to an embodiment of this application. As shown in FIG. 2, the method includes the following steps.

Step 200: A terminal determines, based on first indication information that is received, a target transmission resource configuration indicated by the first indication information from at least one transmission resource configuration.

Step 210: Perform PUSCH transmission based on the target transmission resource configuration.

The first indication information includes at least one of the following:

sounding reference signal SRS resource indication information;

precoding matrix indicator TPMI indication information; and phase tracking reference signal PTRS transmit port indication information.

The at least one transmission resource configuration is determined based on at least one of the following:

pre-indication by a network side;

pre-definition by a protocol;

pre-configuration;

indication by an RRC layer; and indication by a MAC layer.

Optionally, the target transmission resource configuration may be a resource configuration used for PUSCH transmission by the terminal.

Optionally, for codebook-based PUSCH transmission, the network side may configure, for the UE, an SRS resource set to be obtained based on uplink transmission CSI, and each SRS resource set may include two SRS resources. The number of ports included in the two SRS resources may be the same, which may be ports 1, 2, and 4. The two SRS resources may be configured to correspond to different beams.

The network side may obtain uplink channel information by measuring SRSs on different SRS resources, select a spatial relation, precoding matrix, power control, MCS, and other parameters for the UE based on the uplink channel information, and indicate the transmission parameters to the UE by using an SRI field/TPMI field/TPC field/MCS field in DCI format0_1/0_2 for PUSCH scheduling. A spatial relation and port same as those of an SRS resource indicated by the SRI field can be used for PUSCH transmission.

Optionally, for non-codebook-based transmission, four SRS resources may be configured in each SRS resource set for non-codebook-based transmission, and the number of ports for all SRS resources may be 1. An associated CSI-RS can be configured for each SRS resource set and is used for downlink channel measurement by the UE. According to channel reciprocity, the UE may assume a downlink channel under measurement as an uplink channel, and may calculate a precoding matrix for uplink transmission based on the channel information and use the precoding matrix to precode SRS and send the precoded SRS to the network side. Through measurement on the precoded SRS, the network side may determine precoding used for PUSCH transmission by the UE, and performs indication by using the SRI field in the DCI for PUSCH scheduling. That is, the SRI field may indicate a subset of all precoded SRS resources sent by the UE to indicate a precoding matrix to be used for PUSCH transmission.

Optionally, the SRS resource indication information may be used to indicate an SRS resource, and the terminal may perform PUSCH transmission using a spatial relation and port same as those of the SRS resource.

Optionally, the TPMI indication information may be used to indicate a precoding matrix, and the terminal may use the precoding matrix to precode the SRS.

Optionally, the PTRS transmit port indication information may be used to indicate a PTRS transmit port, and the PTRS-DMRS association field indicates at which layer the PTRS is uploaded. The terminal can determine at which layer the PTRS is uploaded.

Optionally, one layer may correspond to one DM-RS port.

Optionally, any one or a combination of the TPMI indication information, the PTRS transmit port indication information, and the TPMI indication information may be used to indicate corresponding information in a resource configuration for PUSCH transmission.

Optionally, after the target transmission resource configuration is determined, that is, after the resource configuration for PUSCH transmission is determined, PUSCH transmission may be performed based on the resource configuration for PUSCH transmission.

Optionally, the terminal may determine, based on the first indication information in the DCI, the target transmission resource configuration indicated by the first indication information.

The first indication information is used to indicate a target transmission resource configuration in at least one transmission resource configuration.

Optionally, the network side may add the first indication information to the DCI and send it to the terminal. After receiving the DCI, the terminal may obtain the first indication information and determine the target transmission resource configuration indicated by the first indication information.

It can be understood that the first indication information includes only indication content, and specific content of the transmission resource configuration may be sent to the terminal by the network side, or be predefined by the protocol, or pre-configured, or indicated by the RRC layer, or indicated by the MAC layer.

Optionally, in the MTRP scenario, PUSCH transmission may use at least one spatial relation and at least one TPMI.

Optionally, multiple spatial relations and multiple sets of TPMI parameters can be proposed, that is, one or more transmission resource configurations may be proposed. Optionally, corresponding resource indication may alternatively be performed by using multiple indication methods. In this way, it can be ensured that PUSCH oriented to multi-TRP transmission is supported on the basis of low overheads for the DCI for scheduling PUSCH transmission.

Optionally, during determining of the target transmission resource configuration indicated by the first indication information, the terminal may determine, based on the first indication information, the target transmission resource configuration indicated by the first indication information from one or more transmission resource configurations.

In this embodiment of this application, at least one transmission resource configuration, that is, multiple sets of transmission parameters, is indicated for PUSCH repetition of the UE. This also ensures that no additional DCI overheads are added.

In this embodiment of this application, the target transmission resource configuration for PUSCH transmission is indicated to the terminal by using at least one of the SRS resource indication information, the TPMI indication information, and the PTRS transmit port indication information, so as to reduce bit overheads for the SRI field and/or TPMI field for the PUSCH transmission resource configuration.

Optionally, the SRS resource indication information includes a codepoint value in an SRI field.

Optionally, the determining, by the terminal based on the first indication information in the DCI, the target transmission resource configuration indicated by the first indication information includes:

based on the codepoint value in the SRI field of the DCI, determining target SRI field codepoint information in at least one piece of SRI field codepoint information; where the at least one piece of SRI field codepoint information is determined by the terminal based on at least one of the following:

pre-indication by a network side;

pre-definition by a protocol;

pre-configuration;

indication by an RRC layer; and indication by a MAC layer.

The SRI field codepoint information is associated with at least one SRS resource, or the SRI field codepoint information is associated with at least one SRS resource group.

Optionally, the SRS resource indication information includes a codepoint value in the SRI field, which may be a low-bit value.

Optionally, at least one transmission resource configuration may include at least one piece of SRI field codepoint information.

Optionally, the SRI field codepoint information is associated with at least one SRS resource.

Optionally, the SRI field codepoint information is associated with at least one SRS resource group.

Optionally, the terminal may determine, based on the codepoint value in the SRI field, the target SRI field codepoint information indicated by the codepoint value in the SRI field from the at least one piece of SRI field codepoint information, and then obtains an SRS resource or SRS resource group associated with the target SRI field codepoint information.

Optionally, different codepoint values in the SRI field are in one-to-one correspondence to the at least one piece of SRI field codepoint information; and a correspondence between the different codepoint values in the SRI field and the at least one piece of SRI field codepoint information is pre-indicated by a network side, pre-defined by a protocol, pre-configured, or indicated by second signaling, where the second signaling is RRC layer signaling or MAC layer signaling.

Optionally, different codepoint values of the SRI field may be in one-to-one correspondence to the at least one piece of SRI field codepoint information, and then the terminal may determine, based on the codepoint value in the SRI field, the target SRI field codepoint information in one-to-one correspondence to the codepoint value in the at least one SRI field.

Optionally, a correspondence between different codepoint values of the SRI field and the at least one piece of SRI field codepoint information may be pre-indicated by the network side, or pre-defined by the protocol, or pre-configured, or indicated by second signaling, where the second signaling is RRC layer signaling or MAC layer signaling.

Optionally, the correspondence between the different codepoint values of the SRI field and the at least one piece of SRI field codepoint information may be described using a table.

For example, as shown in Table 1 below, the network side configures two SRS resource sets for non-codebook-based transmission for the UE, and configures four SRS resources (with indexes of 0, 1, 2, and 3) in each resource set, and the UE receives higher-layer signaling MAC CE from the network side, including 4 codepoints. The SRI field of the DCI is 2 bits, corresponding to 4 codepoints.

TABLE 1

| Indication table for SRI field codepoint information | |
| --- | --- |
| Codepoint value in the SRI field | SRI field codepoint information |
| 0 | $1^{st}$ SRS resource in a first SRS resource set; |
| 1 | $1^{st}$ SRS resource in a first SRS resource set, and $1^{st}$ SRS resource in a second SRS resource set; |
| 2 | $2^{nd}$ SRS resource in a first SRS resource set, and $1^{st}$ SRS resource in a second SRS resource set; |
| 3 | $2^{nd}$ SRS resource in a second SRS resource set. |

Based on Table 1, when the codepoint value in the SRI field of the DCI for scheduling PUSCH repetition is 0, it means that the PUSCH repetition corresponds to one spatial relation, indicating that a spatial relation same as that of the $1^{st}$ SRS resource in the first SRS resource set is used for all repetition occasions of the PUSCH.

When the codepoint value in the SRI field of the DCI for scheduling PUSCH repetition is 1, it means that the PUSCH repetition corresponds to two spatial relations, a first spatial relation is the same as that of the $1^{st}$ SRS resource in the first SRS resource set, and a second spatial relation is the same as that of the $1^{st}$ SRS resource in the second SRS resource set. The $1^{st}$ and $2^{nd}$ repetition occasions of the PUSCH repetition use the first spatial relation for transmission, and the $3^{rd}$ and 4th repetition occasions use the second spatial relation for transmission.

When the codepoint value in the SRI field of the DCI for scheduling PUSCH repetition is 2, it means that the PUSCH repetition corresponds to two spatial relations, a first spatial relation is the same as that of the $2^{nd}$ SRS resource in the first SRS resource set, and a second spatial relation is the same as that of the $1^{st}$ SRS resource in the second SRS resource set. The $1^{st}$ and $2^{nd}$ repetition occasions of the PUSCH repetition use the first spatial relation for transmission, and the $3^{rd}$ and 4th repetition occasions use the second spatial relation for transmission.

When the codepoint value in the SRI field of the DCI for scheduling PUSCH repetition is 3, it means that the PUSCH repetition corresponds to one spatial relation, indicating that a spatial relation same as that of the $2^{nd}$ SRS resource in the second SRS resource set is used for all repetition occasions of the PUSCH.

For example, as shown in Table 1 below, the network side configures two SRS resource sets for codebook-based transmission for the UE, and configures two SRS resources in each resource set, and the UE receives higher-layer signaling MAC CE from the network side, including four pieces of SRI field codepoint information. The SRI field of the DCI is 2 bits, which may be 00, 01, 10, or 11, corresponding to four codepoint values of the SRI field.

TABLE 1

| Indication table for SRI field codepoint information | |
| --- | --- |
| Codepoint value in the SRI field | SRI field codepoint information |
| 0 | $1^{st}$ SRS resource in a first SRS resource set; |
| 1 | $1^{st}$ SRS resource in the first SRS resource set, and $1^{st}$ SRS resource in a second SRS resource set; |
| 2 | $2^{nd}$ SRS resource in the first SRS resource set, and $1^{st}$ SRS resource in the second SRS resource set; |
| 3 | $2^{nd}$ SRS resource in the second SRS resource set. |

For example, as shown in Table 2 below, the network side configures two SRS resource sets for non-codebook-based transmission for the UE, and configures four SRS resources (with indexes of 0, 1, 2, and 3) in each resource set, and the UE receives higher-layer signaling MAC CE from the network side, including four pieces of SRI field codepoint information. The SRI field of the DCI is 2 bits, which may be 00, 01, 10, or 11, corresponding to four codepoint values of the SRI field.

TABLE 2

| Indication table for SRI field codepoint information | |
| --- | --- |
| Codepoint value in the SRI field | SRI field codepoint information |
| 0 | First SRS resource group (SRS resources 0, 1, and 2 in the first SRS resource set); second SRS resource group (SRS resources 1, 2, and 3 in the second SRS resource set); |
| 1 | First SRS resource group (SRS resources 1 and 2 in the first SRS resource set); second SRS resource group (SRS resources 2 and 3 in the second SRS resource set); |
| 2 | SRS resources 0, 1, 2, and 3 in the first SRS resource set; |
| 3 | SRS resources 0, 1, 2, and 3 in the second SRS resource set. |

Based on Table 2, when the codepoint value in the SRI field of the DCI for scheduling PUSCH repetition is 0, it may indicate that the PUSCH repetition corresponds to two SRS resource groups, and the PUSCH transmission occasions are associated with the two SRS resource groups respectively. Ports corresponding to PUSCH transmission occasions associated with the first SRS resource group are the same as those of the SRS resources with indexes of 0, 1, and 2 in the first SRS resource set. Ports corresponding to PUSCH transmission occasions associated with the second SRS resource group are the same as those of the SRS resources with indexes of 1, 2, and 3 in the first SRS resource set.

When the codepoint value in the SRI field of the DCI for scheduling PUSCH repetition is 0, it indicates that the PUSCH repetition corresponds to two SRS resource groups, and the PUSCH transmission occasions are associated with the two SRS resource groups respectively. Ports corresponding to PUSCH transmission occasions associated with the first SRS resource group are the same as those of the SRS resources with indexes of 1 and 2 in the first SRS resource set. Ports corresponding to PUSCH transmission occasions associated with the second SRS resource group are the same as those of the SRS resources with indexes of 2 and 3 in the first SRS resource set.

When the codepoint value in the SRI field of the DCI for scheduling PUSCH repetition is 2, it means that the PUSCH repetition is associated with one SRS resource group, and the ports corresponding to all PUSCH transmission occasions are the same as those of SRS resources with indexes of 0, 1, 2, and 3 in the first SRS resource set.

When the codepoint value in the SRI field of the DCI for scheduling PUSCH repetition is 3, it means that the PUSCH repetition is associated with one SRS resource group, and the ports corresponding to all PUSCH transmission occasions are the same as those of SRS resources with indexes of 0, 1, 2, and 3 in the second SRS resource set.

For example, as shown in Table 3 below, the network side configures for the UE two SRS resource sets for codebook-based transmission, and two SRS resource sets are configured in each set. The UE can receive a MAC CE, and the MAC CE activates one SRS resource in each set. That is, if the number of bits of the SRI field is 0, the SRI codepoint information does not need to be indicated. The SRI field of the DCI uses 2 bits to indicate the codepoint value in the SRI field.

TABLE 3

| Indication table for SRI field codepoint information | |
| --- | --- |
| Codepoint value in the SRI field | SRI field codepoint information |
| 0 | SRS resource in a first SRS resource set; |
| 1 | SRS resource in a second SRS resource set; |
| 2 | resource in the first SRS resource set; and SRS SRS resource in the second SRS resource set; |
| 3 | SRS resource in the second SRS resource set; and SRS resource in the first SRS resource set. |

For example, as shown in Table 4 below, the network side configures for the UE two SRS resource sets for codebook-based transmission, and four SRS resource sets are configured in each set. The UE receives a MAC CE, and the MAC CE activates two SRS resources in each set. The two SRS resources may have the same spatial relation or the same port information, which is alternatively not limited. In this case, there is no need to indicate the SRI field codepoint information. The SRI field of the DCI uses 3 bits or 4 bits to indicate the codepoint value in the SRI field.

TABLE 4

| Indication table for SRI field codepoint information | |
| --- | --- |
| Codepoint value in the SRI field | SRI field codepoint information |
| 0 | First activated SRS resource in a first SRS resource set; |
| 1 | Second activated SRS resource in the first SRS resource set; |
| 2 | First activated SRS resource in a second SRS resource set; |
| 3 | Second activated SRS resource in the second SRS resource set; |
| 4 | First activated SRS resource in the first SRS resource set, and first activated SRS resource in the second SRS resource set; |
| 5 | First activated SRS resource in the first SRS resource set, and second activated SRS resource in the second SRS resource set; |
| 6 | Second activated SRS resource in the first SRS resource set, and first activated SRS resource in the second SRS resource set; |
| 7 | Second activated SRS resource in the first SRS resource set, and second activated SRS resource in the second SRS |

TABLE 4-continued

| Indication table for SRI field codepoint information | |
| --- | --- |
| Codepoint value in the SRI field | SRI field codepoint information |
| | resource set. |

For example, as shown in Table 5 below, if the SRS resource sets configured for codebook-based transmission on the network side each are configured with only one SRS resource. In this case, the correspondence does not need to be additionally indicated by using the MAC CE. That is, in the table, the number of bits of the SRI filed of the DCI is determined by the number of SRS resource sets. If the number of SRS resource sets is 1, the codepoint value in the SRI field is indicated by 0 bits in the SRI field of the DCI (that is, no indication needs to be performed); if the number of SRS resource sets is 2, the codepoint value in the SRI field is indicated by 2 bits in the SRI field of the DCI.

TABLE 5

| Indication table for SRI field codepoint information | |
| --- | --- |
| Codepoint value in the SRI field | SRI field codepoint information |
| 0 | SRS resource in a first SRS resource set; |
| 1 | SRS resource in a second SRS resource set; |
| 2 | SRS resource in the first SRS resource set; and SRS resource in the second SRS resource set; |
| 3 | SRS resource in the second SRS resource set; and SRS resource in the first SRS resource set. |

Optionally, multiple SRS resources or resource groups associated with the SRI field codepoint information belong to different SRS resource sets.

Optionally, multiple SRS resources or resource groups associated with the SRI field codepoint information may belong to different SRS resource sets.

Optionally, one SRS resource set may be configured with only one SRS resource, or two SRS resources, or four SRS resources.

Optionally, one SRS resource set may be configured with only one SRS resource group, or two SRS resource groups, or four SRS resource groups.

Optionally, if the network side or the protocol or the MAC layer or the RRC layer configures multiple SRS resource sets (SRS resource set) for codebook-based transmission for the terminal, the multiple SRS resources associated with the one piece of SRS field codepoint information come from different SRS resource sets respectively.

Optionally, if the network side or the protocol or the MAC layer or the RRC layer configures multiple SRS resource sets for non-codebook-based transmission for the terminal, the multiple SRS resource groups associated with the one piece of codepoint information may come from different SRS resource sets respectively.

Optionally, the number of SRS resources in all SRS resource groups in each piece of codepoint information may be the same.

Optionally, the number of PUSCH transmit ports of the SRS resource associated with one piece of codepoint information is the same.

Optionally, SRS resources in each SRS resource group belong to the same SRS resource set.

Optionally, the SRS resources in each SRS resource group may come from one SRS resource set.

Optionally, the determining, based on the codepoint value in the SRI field of DCI, target SRI field codepoint information in at least one piece of SRI field codepoint information includes:

determining the number of bits in the SRI field based on the number of pieces of the at least one piece of SRI field codepoint information; and determining, based on the number of bits in the SRI field, a value range of the codepoint value in the SRI field of the DCI.

Optionally, the number of bits in the SRI field may be determined based on the number of pieces of the at least one SRI field codepoint information. For example, if the number of pieces of SRI field codepoint information is 5, the number of bits in the SRI field may be at least 3 bits, and a value range of the codepoint value in the SRI field may be 000 to 111, which may be 0 to 7. For example, if the number of pieces of SRI field codepoint information is 4, the number of bits in the SRI field may be at least 2 bits, and the value range of the codepoint value in the SRI field may be 00 to 11, which may be 0 to 4.

Optionally, during determining of the SRS resource indication information from the DCI, the SRS resource indication information may be determined based on the SRS resource indication information and/or based on the value range of the codepoint value in the SRI field.

Optionally, the performing PUSCH transmission based on the target transmission resource configuration includes:

determining, based on the target transmission resource configuration, an SRS resource associated with a repetition occasion of PUSCH; and performing PUSCH transmission based on the SRS resource associated with the repetition occasion.

Optionally, in a case that the target transmission resource configuration is the target SRI field codepoint information, a corresponding SRS resource may be determined based on the target SRI field codepoint information, that is, to determine an SRS resource associated with the repetition occasion of PUSCH.

Optionally, after the SRS resource associated with the repetition occasion of the PUSCH is determined, PUSCH transmission may be performed based on the SRS resource associated with the repetition occasion.

Optionally, the determining, based on the target transmission resource configuration, an SRS resource associated with a repetition occasion of PUSCH includes:

determining a mapping manner between PUSCH transmission occasions and at least one SRS resource or resource group associated with the target SRI field codepoint information; and determining, based on the mapping manner, an SRS resource associated with the repetition occasion of the PUSCH.

Optionally, during determining of the corresponding SRS resource based on the target SRI field codepoint information, a mapping manner between the PUSCH transmission occasions and at least one SRS resource or resource group associated with the target SRI field codepoint information may be determined, and the SRS resource associated with the repetition occasion of the PUSCH is determined based on the mapping manner.

It can be understood that the mapping relationship may be understood as a correspondence formed when at least one SRS resource or resource group is associated with PUSCH transmission occasions one by one.

Optionally, one transmission occasion of the PUSCH is associated with one or more SRS resources or SRSs.

Optionally, a transmission spatial relation and port corresponding to one transmission occasion of the PUSCH are the same as those of the associated SRS resource or SRS resource group.

Optionally, in a case that the number of PUSCH repetitions is greater than or equal to 2, the mapping manner includes:

the at least one SRS resource or resource group is alternately or sequentially mapped to a plurality of repetition occasions of PUSCH.

Optionally, at least one SRS resource or resource group may be alternately mapped to multiple repetition occasions of the PUSCH.

Optionally, after being all repeated in sequence, the at least one SRS resource or resource group is associated with multiple repetition occasions of the PUSCH one by one.

Optionally, using at least one SRS resource including a first resource and a second resource or a first resource group and a second resource group as an example, the at least one SRS resource or resource group may be alternately mapped to the multiple repetition occasions of the PUSCH by using the following mapping scheme:

the $1^{st}$ repetition occasion of the PUSCH is associated with a first SRS resource or a first SRS resource group in the SRI field codepoint information;

the $2^{nd}$ repetition occasion is associated with a second SRS resource or a second SRS resource group in the SRI field codepoint information;

the $3^{rd}$ repetition occasion is associated with the first SRS resource or the first SRS resource group in the SRI field codepoint information;

the 4th repetition occasion is associated with the second SRS resource or the second SRS resource group in the SRI field codepoint information;

and so on.

Optionally, at least one SRS resource or resource group may be sequentially mapped to multiple repetition occasions of the PUSCH.

Optionally, after being partially repeated in sequence, the at least one SRS resource or resource group is entirely associated with multiple repetition occasions of the PUSCH one by one.

Optionally, using at least one SRS resource including a first resource and a second resource or a first resource group and a second resource group as an example, the at least one SRS resource or resource group may be sequentially mapped to the multiple repetition occasions of the PUSCH by using the following mapping scheme:

the $1^{st}$ and $2^{nd}$ repetition occasions of the PUSCH are associated with a first SRS resource or a first SRS resource group in the SRI field codepoint information;

the $3^{rd}$ and 4th repetition occasions are associated with a second SRS resource or a second SRS resource group in the SRI field codepoint information;

the 5th and 6th repetition occasions are associated with the first SRS resource or the first SRS resource group in the SRI field codepoint information;

the 7th and 8th repetition occasions are associated with the second SRS resource or the second SRS resource group in the SRI field codepoint information;

and so on.

Optionally, in a case that the number of PUSCH repetitions is 1, the mapping manner includes:

sequentially performing one-to-one mapping of the at least one SRS resource or resource group to a plurality of partial repetition occasions in one repetition occasion of PUSCH, where the plurality of partial repetition occasions form the one repetition occasion.

Optionally, in a case that the number of repetitions of the PUSCH is 1, at least one SRS resource or resource group may be sequentially mapped to multiple partial repetition occasions in one repetition occasion of PUSCH one by one.

Optionally, using at least one SRS resource including a first resource and a second resource or a first resource group and a second resource group as an example, the first [N/2] symbols of the PUSCH transmission occasion are associated with the first SRS resource or the first SRS resource group, and the rest N-⌊N/2⌋ symbols are associated with the second SRS resource or the second SRS resource group.

Optionally, the first SRS resource/SRS resource group and the second SRS resource/SRS resource group may be determined according to a sequence in the SRI codepoint information, or according to indexes (SRS resource set ID) of the SRS resource sets to which the first SRS resource/SRS resource group and the second SRS resource/SRS resource group belong.

Optionally, a sequence of the at least one SRS resource or resource group is determined based on an association sequence in the target SRI field codepoint information.

Optionally, a sequence of the at least one SRS resource or resource group may be determined based on an association sequence in the target SRI field codepoint information.

Optionally, using at least one SRS resource including a first resource and a second resource or a first resource group and a second resource group as an example, the first SRS resource/SRS resource group and the second SRS resource/SRS resource group may be determined according to a sequence in the SRI codepoint information.

Optionally, a sequence of the at least one SRS resource or resource group is determined based on an index (SRS resource set ID) of an SRS resource set to which the at least one SRS resource or resource group belongs.

Optionally, a sequence of the at least one SRS resource or resource group may be determined based on an index (SRS resource set ID) of an SRS resource set to which the at least one SRS resource or resource group belongs.

Optionally, using at least one SRS resource including a first resource and a second resource or a first resource group and a second resource group as an example, the first SRS resource/SRS resource group and the second SRS resource/SRS resource group may be determined according to indexes (SRS resource set ID) of SRS resource sets to which the first resource and second resource or the first resource group and second resource group belong.

Optionally, different SRS resource sets are associated with different CORESETPoolIndex; and different DCIs are from CORESETs associated with the different CORESETPoolIndex.

Optionally, the SRI fields of different DCIs indicate SRS resources or SRS resource groups from different SRS resource sets.

Optionally, different SRS resource sets are associated with different CORESETPoolIndex.

Optionally, different DCIs come from CORESETs associated with different CORESETPoolIndex.

Optionally, the PTRS transmit port indication information includes indication information in a PTRS-DMRS association field.

The determining, by the terminal based on the first indication information in the DCI, the target transmission resource configuration indicated by the first indication information includes:

determining, based on third signaling of an RRC layer or a MAC layer, indication information in a PTRS-DMRS association field of DCI; and determining, based on the indication information in the PTRS-DMRS association field, a target association relationship in at least one association relationship between PTRS ports and DMRS transmit port.

The DMRS transmit port is associated with an SRS resource or SRS resource group for PUSCH transmission.

Optionally, the PTRS transmit port indication information includes the indication information in the PTRS-DMRS association field. The indication information in the PTRS-DMRS association field of the DCI may be determined first, and the target association relationship indicated is then determined based on the indication information in the PTRS-DMRS association field from the at least one association relationship between PTRS ports and DMRS transmit ports in the indication information in the PTRS-DMRS association field.

Furthermore, based on the target association relationship between PTRS ports and DMRS transmit ports, it can be determined to which layer the PTRS is uploaded.

For example, one layer may correspond to one DMRS transmit port, and it can be determined that the PTRS is uploaded at a layer corresponding to the associated DMRS transmit port.

Optionally, the third signaling includes:

the maximum number of PTRS ports; and the maximum number of transmission ranks and/or SRS ports.

Optionally, the third signaling may include the maximum number of PTRS ports.

Optionally, the third signaling may include the maximum number of transmission ranks and/or SRS ports.

For example, the indication information in the PTRS-DMRS association field of the DCI may be determined based on the maximum number of PTRS ports and the maximum number of transmission ranks.

Optionally, the determining, based on third signaling of an RRC layer or a MAC layer, indication information in a PTRS-DMRS association field of DCI includes:

determining, based on the third signaling, the number of bits of the indication information in the PTRS-DMRS association field of the DCI; and determining, based on the number of bits of the indication information in the PTRS-DMRS association field, a value range of the indication information in the PTRS-DMRS association field of the DCI.

Optionally, the determining, based on third signaling, indication information in a PTRS-DMRS association field of DCI may be determining, based on the third signaling, the number of bits of the indication information in the PTRS-DMRS association field of the DCI, so as to determine a value range of the indication information in the PTRS-DMRS association field of the DCI.

For example, the number of bits of the indication information in the PTRS-DMRS association field may be 3 bits, and the value range of the indication information in the PTRS-DMRS association field may be 000 to 111, which may be 0 to 7. For example, the number of bits of the indication information in the PTRS-DMRS association field may be at least 2 bits, and the value range of the indication information in the PTRS-DMRS association field may be 00 to 11, which may be 0 to 4.

Optionally, the determining indication information in a PTRS-DMRS association field of DCI may be determining the indication information in the PTRS-DMRS association field based on the number of bits of the indication information in the PTRS-DMRS association field and/or based on the value range of the indication information in the PTRS-DMRS association field. Optionally, the indication information in the PTRS-DMRS association field includes a second value of the PTRS-DMRS association field; and different second values are in one-to-one correspondence to the at least one association relationship.

Optionally, the indication information of the PTRS-DMRS association field may include a second value of the PTRS-DMRS association field, which, for example, may be 0, 1, 2, or 3.

Optionally, the determining, based on the indication information in the PTRS-DMRS association field, a target association relationship in at least one association relationship between PTRS ports and DMRS transmit port includes:

determining, based on the second value of the PTRS-DMRS association field, that an association relationship corresponding to the second value is the target association relationship.

Optionally, it may be determined, based on the second value of the PTRS-DMRS association field, that an association relationship corresponding to the second value is the target association relationship.

For example, the value range of the second value is 0 to 3. Then, 0, 1, 2, and 3 are in one-to-one correspondence to four different association relationships. In this way, based on a specific value of the second value, a target association relationship in one-to-one correspondence to the value can be determined.

Optionally, the determining, based on the third signaling, the number of bits of the indication information in the PTRS-DMRS association field of the DCI includes:

in a case that the maximum number of PTRS ports is 1 or 2 and the maximum number of transmission ranks is 2, determining that the number of bits of the indication information in the PTRS-DMRS association field is 2 bits, so as to further determine the second value of the indication information of the PTRS-DMRS association field.

Optionally, in a case that the maximum number of PTRS ports is 1 or 2 and the maximum number of transmission ranks is 2, it may be determined that the number of bits of the indication information in the PTRS-DMRS association field is 2 bits.

Optionally, the second value of the indication information in the PTRS-DMRS association field includes a third value of the most significant bit MSB and a fourth value of the least significant bit LSB.

Optionally, in a case that the number of bits of the indication information in the PTRS-DMRS association field is 2 bits, the second value of the indication information in the PTRS-DMRS association field may include a third value of the most significant bit MSB and a fourth value of the least significant bit LSB.

Optionally, the third value of the most significant bit MSB includes 0 or 1.

In a case that the third value of the most significant bit MSB is 0, the target association relationship includes: PTRS port 0 is associated with the $1^{st}$ scheduled DM-RS port associated with a first SRS resource or SRS resource group; and in a case that the third value of the most significant bit MSB is 1, the target association relationship includes: PTRS port 0 is associated with the $2^{nd}$ scheduled DM-RS port associated with the first SRS resource or SRS resource group.

Optionally, in a case that the number of bits of the indication information in the PTRS-DMRS association field is 2 bits and the third value of the most significant bit MSB is 0, the terminal can determine that the target association relationship includes but is not limited to: PTRS port 0 is associated with the $1^{st}$ scheduled DM-RS port associated with a first SRS resource or SRS resource group.

Optionally, in a case that the number of bits of the indication information in the PTRS-DMRS association field is 2 bits and the third value of the most significant bit MSB is 1, the terminal can determine that the target association relationship includes but is not limited to: PTRS port 0 is associated with the $2^{nd}$ scheduled DM-RS port associated with a first SRS resource or SRS resource group.

Optionally, the fourth value of the least significant bit LSB includes 0 or 1.

In a case that the fourth value of the least significant bit LSB is 0, the target association relationship includes: PTRS port 0 is associated with the $1^{st}$ scheduled DM-RS port associated with a second SRS resource or SRS resource group; and in a case that the fourth value of the least significant bit LSB is 1, the target association relationship includes: PTRS port 0 is associated with the $2^{nd}$ scheduled DM-RS port associated with the second SRS resource or SRS resource group.

Optionally, in a case that the number of bits of the indication information in the PTRS-DMRS association field is 2 bits and the fourth value of the least significant bit LSB is 0, the terminal can determine that the target association relationship includes but is not limited to: PTRS port 0 is associated with the $1^{st}$ scheduled DM-RS port associated with a second SRS resource or SRS resource group.

Optionally, in a case that the number of bits of the indication information in the PTRS-DMRS association field is 2 bits and the fourth value of the least significant bit LSB is 1, the terminal can determine that the target association relationship includes: PTRS port 0 is associated with the $2^{nd}$ scheduled DM-RS port associated with a second SRS resource or SRS resource group.

Optionally, the foregoing association relationships may be expressed based on the following table 6.

TABLE 6

| | Target association relationship indication information | |
| --- | --- | --- |
| Second value | Target association relationship corresponding to the MSB | Target association relationship corresponding to the LSB |
| 0 | PTRS port 0 is associated with the $1^{st}$ scheduled DM-RS port associated with the first SRS resource or SRS resource group | PTRS port 0 is associated with the $1^{st}$ scheduled DM-RS port associated with the second SRS resource or SRS resource group |
| 1 | PTRS port 0 is associated with the $2^{nd}$ scheduled DM-RS port associated with the first SRS resource or SRS resource group | PTRS port 0 is associated with the $2^{nd}$ scheduled DM-RS port associated with the second SRS resource or SRS resource group |

Optionally, in a case that the number of bits of the indication information of the PTRS-DMRS association field is 2 bits, if the terminal receives higher-layer signaling that configures the maximum number of transmission ranks of the UE to be 3 (maxRank is configured to be 3) and the maximum number of PTRS ports to be 2, the PTRS-DMRS association field may be indicated based on 2 bits. That is, as shown the following table, the association relationship may alternatively be expressed based on the following table 7.

TABLE 7

| | Target association relationship indication information | |
| --- | --- | --- |
| Second value | Target association relationship corresponding to the MSB | Target association relationship corresponding to the LSB |
| 0 | Shared PTRS port 0 or 1 is associated with the $1^{st}$ scheduled DM-RS port associated with the first SRS resource or SRS resource group | Shared PTRS port 0 or 1 is associated with the $1^{st}$ scheduled DM-RS port associated with the second SRS resource or SRS resource group |
| 1 | Shared PTRS port 0 or 1 is associated with the $2^{nd}$ scheduled DM-RS port associated with the first SRS resource or SRS resource group | Shared PTRS port 0 or 1 is associated with the $2^{nd}$ scheduled DM-RS port associated with the second SRS resource or SRS resource group |

Optionally, in a case that all repetition occasions of the PUSCH are associated with one SRS resource or SRS resource group, the determining, based on the indication information in the PTRS-DMRS association field, a target association relationship in at least one association relationship between PTRS ports and DMRS transmit ports includes:

determining, based on information about part of bits of the indication information in the PTRS-DMRS association field, the target association relationship in the at least one association relationship between PTRS ports and DMRS transmit ports; where the part of bits are an MSB or LSB.

Optionally, if all transmission occasions of PUSCH scheduled by one piece of DCI are associated with one SRS resource or SRS resource group, the terminal can interpret only the MSB or only the LSB.

Optionally, the determining, based on the maximum number of transmission ranks and the maximum number of PTRS ports, the number of bits of the indication information in the PTRS-DMRS association field of the DCI includes:

in a case that the maximum number of PTRS ports is 1 and the maximum number of transmission ranks is 3 or 4, determine that the number of bits of the indication information in the PTRS-DMRS association field is 4 bits.

Optionally, in a case that the maximum number of PTRS ports is 1 and the maximum number of transmission ranks is 3 or 4, it may be determined the number of bits of the indication information in the PTRS-DMRS association field is 4 bits.

Optionally, the second value of the indication information in the PTRS-DMRS association field includes a fifth value of the most significant bit MSB and a sixth value of the least significant bit LSB; and the most significant bit MSB is 2 bits, and the least significant bit LSB is 2 bits.

Optionally, in a case that the number of bits of the indication information in the PTRS-DMRS association field is 4 bits, the second value may include a fifth value of the most significant bit MSB and a sixth value of the least significant bit LSB.

Optionally, in a case that the number of bits of the indication information in the PTRS-DMRS association field is 4 bits, the most significant bit MSB may be the first 2 high-order bits, and the least significant bit LSB may be the last 2 low-order bits.

Optionally, the fifth value of the most significant bit MSB is 0, 1, 2, or 3.

In a case that the fifth value of the most significant bit MSB is 0, the target association relationship includes: PTRS port 0 is associated with the 1$^{st}$ scheduled DM-RS port associated with the first SRS resource or SRS resource group;

in a case that the fifth value of the most significant bit MSB is 1, the target association relationship includes: PTRS port 0 is associated with the 2$^{nd}$ scheduled DM-RS port associated with the first SRS resource or SRS resource group;

in a case that the fifth value of the most significant bit MSB is 2, the target association relationship includes: PTRS port 0 is associated with the 3$^{rd}$ scheduled DM-RS port associated with the first SRS resource or SRS resource group; and in a case that the fifth value of the most significant bit MSB is 3, the target association relationship includes: PTRS port 0 is associated with the 4th scheduled DM-RS port associated with the first SRS resource or SRS resource group.

Optionally, in a case that the number of bits of the indication information in the PTRS-DMRS association field is 4 bits and the fifth value of the most significant bit MSB is 0, the terminal can determine that the target association relationship includes: PTRS port 0 is associated with the 1$^{st}$ scheduled DM-RS port associated with the first SRS resource or SRS resource group.

Optionally, in a case that the number of bits of the indication information in the PTRS-DMRS association field is 4 bits and the fifth value of the most significant bit MSB is 1, the terminal can determine that the target association relationship includes: PTRS port 0 is associated with the 2$^{nd}$ scheduled DM-RS port associated with the first SRS resource or SRS resource group.

Optionally, in a case that the number of bits of the indication information in the PTRS-DMRS association field is 4 bits and the fifth value of the most significant bit MSB is 2, the terminal can determine that the target association relationship includes: PTRS port 0 is associated with the 3$^{rd}$ scheduled DM-RS port associated with the first SRS resource or SRS resource group.

Optionally, in a case that the number of bits of the indication information in the PTRS-DMRS association field is 4 bits and the fifth value of the most significant bit MSB is 3, the terminal can determine that the target association relationship includes: PTRS port 0 is associated with the 4th scheduled DM-RS port associated with the first SRS resource or SRS resource group.

Optionally, the sixth value of the least significant bit LSB is 0, 1, 2, or 3.

in a case that the sixth value of the least significant bit LSB is 0, the target association relationship includes: TRS port 0 is associated with the 1$^{st}$ scheduled DM-RS port associated with the second SRS resource or SRS resource group;

in a case that the sixth value of the least significant bit LSB is 1, the target association relationship includes: TRS port 0 is associated with the 2$^{nd}$ scheduled DM-RS port associated with the second SRS resource or SRS resource group;

in a case that the sixth value of the least significant bit LSB is 2, the target association relationship includes: PTRS port 0 is associated with the 3$^{rd}$ scheduled DM-RS port associated with the second SRS resource or SRS resource group; and in a case that the sixth value of the least significant bit LSB is 3, the target association relationship includes: PTRS port 0 is associated with the 4th scheduled DM-RS port associated with the second SRS resource or SRS resource group.

Optionally, in a case that the number of bits of the indication information in the PTRS-DMRS association field is 4 bits and the sixth value of the least significant bit LSB is 0, the terminal can determine that the target association relationship includes: PTRS port 0 is associated with the 1$^{st}$ scheduled DM-RS port associated with the second SRS resource or SRS resource group.

Optionally, in a case that the number of bits of the indication information in the PTRS-DMRS association field is 4 bits and the sixth value of the least significant bit LSB is 1, the terminal can determine that the target association relationship includes: TRS port 0 is associated with the 2$^{nd}$ scheduled DM-RS port associated with the second SRS resource or SRS resource group.

Optionally, in a case that the number of bits of the indication information in the PTRS-DMRS association field is 4 bits and the sixth value of the least significant bit LSB is 2, the terminal can determine that the target association relationship includes: PTRS port 0 is associated with the 3$^{rd}$ scheduled DM-RS port associated with the second SRS resource or SRS resource group.

Optionally, in a case that the number of bits of the indication information in the PTRS-DMRS association field is 4 bits and the sixth value of the least significant bit LSB is 3, the terminal can determine that the target association relationship includes: PTRS port 0 is associated with the 4th scheduled DM-RS port associated with the second SRS resource or SRS resource group.

Optionally, the foregoing association relationships may be expressed based on the following table 7.

TABLE 7

Target association relationship indication information

| Second value | Target association relationship corresponding to the MSB | Target association relationship corresponding to the LSB |
|---|---|---|
| 0 | PTRS port 0 is associated with the 1$^{st}$ scheduled DM-RS port associated with the first SRS resource or SRS resource group | PTRS port 0 is associated with the 1$^{st}$ scheduled DM-RS port associated with the second SRS resource or SRS resource group |
| 1 | PTRS port 0 is associated with the 2$^{nd}$ scheduled DM-RS port associated with the first SRS resource or SRS resource group | PTRS port 0 is associated with the 2$^{nd}$ scheduled DM-RS port associated with the second SRS resource or SRS resource group |
| 2 | PTRS port 0 is associated with the 3$^{rd}$ scheduled DM-RS port associated with the first SRS resource or SRS resource group | PTRS port 0 is associated with the 3$^{rd}$ scheduled DM-RS port associated with the second SRS resource or SRS resource group |
| 3 | PTRS port 0 is associated with the 4$^{th}$ scheduled DM-RS port associated with the first SRS resource or SRS resource group | PTRS port 0 is associated with the 4$^{th}$ scheduled DM-RS port associated with the second SRS resource or SRS resource group |

Optionally, in a case that all repetition occasions of the PUSCH are associated with one SRS resource or SRS resource group, the determining, based on the indication information in the PTRS-DMRS association field, a target association relationship in at least one association relationship between PTRS ports and DMRS transmit ports includes:

determining, based on information about part of bits of the indication information in the PTRS-DMRS association field, the target association relationship in the at least one association relationship between PTRS ports and DMRS transmit ports; where the part of bits are an MSB.

Optionally, if all transmission occasions of PUSCH scheduled by one piece of DCI are associated with one SRS resource or SRS resource group, the terminal can interpret only the MSB.

Optionally, the determining, based on the maximum number of transmission ranks and the maximum number of PTRS ports, the number of bits of the indication information in the PTRS-DMRS association field of the DCI includes:

in a case that the maximum number of PTRS ports is 2 and the maximum number of transmission ranks is 3 or 4, determining that the number of bits of the indication information in the PTRS-DMRS association field is 4 bits.

Optionally, in a case that the maximum number of PTRS ports is 2 and the maximum number of transmission ranks is 3 or 4, the terminal may determine that the number of bits of the indication information in the PTRS-DMRS association field is 4 bits.

Optionally, the second value of the indication information in the PTRS-DMRS association field includes a seventh value of a first bit, an eighth value of a second bit, a ninth value of a third bit, and a tenth value of a fourth bit.

Optionally, in a case that the number of bits of the indication information in the PTRS-DMRS association field is 4 bits, the second value includes a seventh value of a first bit, an eighth value of a second bit, a ninth value of a third bit, and a tenth value of a fourth bit.

Optionally, the seventh value of the first bit includes 0 or 1.

In a case that the seventh value of the first bit is 0, the target association relationship includes: shared PTRS port 0 is associated with the $1^{st}$ scheduled DM-RS port associated with a first SRS resource or SRS resource group; and in a case that the seventh value of the first bit is 1, the target association relationship includes: shared PTRS port 0 is associated with the $2^{nd}$ scheduled DM-RS port associated with the first SRS resource or SRS resource group.

Optionally, in a case that the number of bits of the indication information in the PTRS-DMRS association field is 4 bits and the seventh value of the first bit is 0, the terminal can determine that the target association relationship includes: shared PTRS port 0 is associated with the $1^{st}$ scheduled DM-RS port associated with the first SRS resource or SRS resource group.

Optionally, in a case that the number of bits of the indication information in the PTRS-DMRS association field is 4 bits and the seventh value of the first bit is 1, the terminal can determine that the target association relationship includes: shared PTRS port 0 is associated with the $2^{nd}$ scheduled DM-RS port associated with the first SRS resource or SRS resource group.

Optionally, the eighth value of the second bit includes 0 or 1.

In a case that the eighth value of the second bit is 0, the target association relationship includes: shared PTRS port 1 is associated with the $1^{st}$ scheduled DM-RS port associated with the first SRS resource or SRS resource group; and includes: shared PTRS port 1 is associated with the $2^{nd}$ scheduled DM-RS port associated with the first SRS resource or SRS resource group.

Optionally, in a case that the number of bits of the indication information in the PTRS-DMRS association field is 4 bits and the eighth value of the second bit is 0, the terminal can determine that the target association relationship includes: shared PTRS port 1 is associated with the $1^{st}$ scheduled DM-RS port associated with the first SRS resource or SRS resource group.

Optionally, in a case that the number of bits of the indication information in the PTRS-DMRS association field is 4 bits and the eighth value of the second bit is 1, the terminal can determine that the target association relationship includes: shared PTRS port 1 is associated with the $2^{nd}$ scheduled DM-RS port associated with the first SRS resource or SRS resource group.

Optionally, the ninth value of the third bit includes 0 or 1.

In a case that the ninth value of the third bit is 0, the target association relationship includes: shared PTRS port 0 is associated with the $1^{st}$ scheduled DM-RS port associated with the second SRS resource or SRS resource group; and in a case that the ninth value of the third bit is 1, the target association relationship includes: shared PTRS port 0 is associated with the $2^{nd}$ scheduled DM-RS port associated with the second SRS resource or SRS resource group.

Optionally, in a case that the number of bits of the indication information in the PTRS-DMRS association field is 4 bits and the ninth value of the third bit is 0, the terminal can determine that the target association relationship includes: shared PTRS port 0 is associated with the $1^{st}$ scheduled DM-RS port associated with the second SRS resource or SRS resource group.

Optionally, in a case that the number of bits of the indication information in the PTRS-DMRS association field is 4 bits and the ninth value of the third bit is 1, the terminal can determine that the target association relationship includes: shared PTRS port 0 is associated with the $2^{nd}$ scheduled DM-RS port associated with the second SRS resource or SRS resource group.

Optionally, the tenth value of the fourth bit includes 0 or 1.

In a case that the tenth value of the fourth bit is 0, the target association relationship includes: shared PTRS port 1 is associated with the $1^{st}$ scheduled DM-RS port associated with the second SRS resource or SRS resource group; and in a case that the tenth value of the fourth bit is 1, the target association relationship includes: shared PTRS port 1 is associated with the $2^{nd}$ scheduled DM-RS port associated with the second SRS resource or SRS resource group.

Optionally, in a case that the number of bits of the indication information in the PTRS-DMRS association field is 4 bits and the tenth value of the fourth bit is 0, the terminal can determine that the target association relationship includes: shared PTRS port 1 is associated with the $1^{st}$ scheduled DM-RS port associated with the second SRS resource or SRS resource group.

Optionally, in a case that the number of bits of the indication information in the PTRS-DMRS association field is 4 bits and the tenth value of the fourth bit is 1, the terminal can determine that the target association relationship includes: shared PTRS port 1 is associated with the $2^{nd}$ scheduled DM-RS port associated with the second SRS resource or SRS resource group.

Optionally, in a case that all repetition occasions of the PUSCH are associated with one SRS resource or SRS resource group, the determining a target association relationship in at least one association relationship between PTRS ports and DMRS transmit ports includes:

determining, based on information about part of bits of the indication information in the PTRS-DMRS association field, the target association relationship in the at least one association relationship between PTRS ports and DMRS transmit ports; where the part of bits include the first bit and the second bit.

Optionally, if all transmission occasions of PUSCH scheduled by one piece of DCI are associated with one SRS resource or SRS resource group, the terminal can interpret only the first bit and the second bit.

Optionally, in a case that the first indication information includes TPMI indication information, the performing PUSCH transmission based on the target transmission resource configuration includes:

performing transmission based on a first transmission mode or a second transmission mode by using one or more target TPMIs indicated by the TPMI indication information.

Optionally, one or more target TPMIs may be used for PUSCH transmission.

Optionally, one or more target TPMIs may be used for PUSCH transmission based on multiple transmission modes.

Optionally, the transmission mode may be selected to specifically use the first transmission mode for transmission or use the second transmission mode for transmission.

Optionally, the number of bits of the TPMI indication information may be determined based on an indication of the fifth signaling sent by an RRC layer or a MAC layer, and the value range of its content may be determined based on the number of bits of the TPMI indication information. for example, the TPMI indication information may include a TPMI codepoint value. In this case, TPMI codepoint configuration information corresponding to the TPMI codepoint value can be determined. It should be noted that the TPMI codepoint configuration information is associated with multiple TPMI configurations. Therefore, the target TPMI codepoint configuration information can be determined based on the TPMI codepoint value, so as to further determine the TPMI used for transmission.

Optionally, the first transmission mode includes:

a first TPMI in the one or more target TPMIs is used for transmission for all PUSCH transmission occasions associated with different SRS resources or SRS resource groups.

Optionally, in the first transmission mode, PUSCH transmission occasions associated with different SRS resources may all use one TPMI for transmission.

Optionally, the first TPMI is determined based on the TPMI indication information.

The TPMI indication information includes:

TPMI field related information in DCI; and/or fourth signaling sent by an RRC layer or a MAC layer.

Optionally, the first TPMI may be determined based on the TPMI indication information.

Optionally, the first TPMI may be determined based on the TPMI field related information in the DCI.

Optionally, the first TPMI may be determined based on the fourth signaling sent by the RRC layer or MAC layer.

Optionally, the first TPMI may be determined based on the TPMI field related information in the DCI and the fourth signaling sent by the RRC layer or MAC layer.

Optionally, the second transmission mode includes:

different TPMIs in the one or more target TPMIs are used for transmission for PUSCH transmission occasions associated with different SRS resources or SRS resource groups.

Optionally, in the second transmission mode, different TPMIs in the one or more target TPMIs are used for transmission for PUSCH transmission occasions associated with different SRS resources or SRS resource groups.

Optionally, that different TPMIs in the one or more target TPMIs are used for transmission for PUSCH transmission occasions associated with different SRS resources or SRS resource groups includes:

the SRS resources or SRS resource groups associated with the PUSCH transmission occasions are in one-to-one correspondence to the TPMIs used for the PUSCH transmission occasions.

Optionally, in the second transmission mode, the SRS resources or SRS resource groups associated with the PUSCH transmission occasions are in one-to-one correspondence to the TPMIs used for the PUSCH transmission occasions.

Optionally, that different TPMIs in the one or more target TPMIs are used for transmission for PUSCH transmission occasions associated with different SRS resources or SRS resource groups includes:

the TPMIs used for the PUSCH transmission occasions associated with different SRS resources or SRS resource groups are determined based on the TPMI indication information.

The TPMI indication information includes:

TPMI field related information in DCI; and/or fifth signaling sent by an RRC layer or a MAC layer.

Optionally, in the second transmission mode, the TPMIs used for the PUSCH transmission occasions associated with different SRS resources or SRS resource groups are determined based on the TPMI indication information.

Optionally, the TPMI indication information may be the TPMI field related information in the DCI.

Optionally, the TPMI indication information may be the fifth signaling sent by the RRC layer or the MAC layer.

Optionally, TPMIs used by the PUSCH transmission occasions associated with different SRS resources or SRS resource groups may be determined based on both the TPMI field related information in the DCI and the fifth signaling sent by the RRC layer or the MAC layer. Optionally, the performing transmission based on a first transmission mode or a second transmission mode by using one or more target TPMIs indicated by the TPMI indication information includes:

based on sixth signaling, determining to perform transmission based on the first transmission mode by using one or more target TPMIs; or based on sixth signaling, determining to perform transmission based on the second transmission mode by using one or more target TPMIs; where the sixth signaling is RRC layer signaling and/or MAC layer signaling.

Optionally, switching between the first transmission mode and the second transmission mode may be performed based on the sixth signaling.

Optionally, if it is determined based on the sixth signaling that one or more target TPMIs are used for transmission based on the first transmission mode, in a case that a current transmission mode is the first transmission mode, the current transmission mode remains unchanged; in a case that the current transmission mode is the second transmission mode, the current transmission mode is then switched to the first transmission mode.

Optionally, if it is determined based on the sixth signaling that one or more target TPMIs are used for transmission based on the second transmission mode, in a case that a current transmission mode is the first transmission mode, the current transmission mode is then switched to the second transmission mode; in a case that the current transmission mode is the second transmission mode, the current transmission mode remains unchanged.

Optionally, the sixth signaling includes RRC configuration information and/or MAC CE indication signaling.

Optionally, the sixth signaling may be RRC configuration information.

Optionally, the sixth signaling may be MAC CE indication signaling.

Optionally, indication using the sixth signaling may be indication using either or both of RRC configuration information and MAC CE indication signaling.

Optionally, the SRS resource indication information and/or TPMI indication information is associated with first signaling.

Optionally, the TPMI field and/or the PTRS-DMRS association field is related to higher-layer signaling including the SRS resource codepoint information, that is, the first signaling.

Optionally, if the UE receives a MAC CE containing codepoints of the SRI field and the TPMI field and sends a HARQ ACK feedback in slot n and slot m (m≥n) separately, SRI field codepoint information and TPMI codepoint information are correspondingly indicated to take effect at a time point in 3 ms after slot m.

Optionally, an association relationship between the TPMI indication information and the first signaling includes:

in a case that all SRI field codepoint information contained in the first signaling is associated with only one SRS resource or SRS resources associated with all the SRI field codepoint information belong to one SRS resource set, the TPMI indication information is in one-to-one correspondence to PUSCH repetition occasions.

Optionally, in a case that all SRI field codepoint information contained in the first signaling is associated with only one SRS resource or SRS resources associated with all the SRI field codepoint information belong to one SRS resource set, the TPMI indication information may be in one-to-one correspondence to spatial relations used for PUSCH repetition.

Optionally, in a case that all codepoints contained in the higher-layer signaling contain only one SRS resource, or all SRS resources contained in the codepoints belong to one SRS resource set, the TPMI indication method may be the same as an indication method in the existing communication system.

Optionally, in a case that all codepoints contained in the higher-layer signaling contain only one SRS resource/SRS resource group, or all SRS resources/SRS resource groups contained in the codepoints belong to one SRS resource set, the PTRS-DMRS association indication method may be the same as an indication method in the existing communication system.

Optionally, in a case that the terminal receives no higher-layer signaling, the indication method of the TPMI field and the PTRS-DMRS association may be the same as an indication method in the existing communication system.

In this embodiment of this application, the target transmission resource configuration for PUSCH transmission is indicated to the terminal by using at least one of the SRS resource indication information, the TPMI indication information, and the PTRS transmit port indication information, so as to reduce bit overheads for the SRI field and/or TPMI field for the PUSCH transmission resource configuration.

FIG. 3 is a second schematic flowchart of a PUSCH transmission method according to an embodiment of this application. As shown in FIG. 3, the method includes the following steps.

Step 300:

A network side sends first indication information to a terminal.

The first indication information is used to instruct the terminal to determine a target transmission resource configuration indicated by the first indication information from at least one transmission resource configuration.

The first indication information includes at least one of the following:

sounding reference signal SRS resource indication information;

precoding matrix indicator TPMI indication information; and phase tracking reference signal PTRS transmit port indication information.

The at least one transmission resource configuration is determined based on at least one of the following:

pre-indication by a network side;

pre-definition by a protocol;

pre-configuration;

indication by an RRC layer; and indication by a MAC layer.

Optionally, the target transmission resource configuration may be a resource configuration used for PUSCH transmission by the terminal.

Optionally, for codebook-based PUSCH transmission, the network side may configure, for the UE, an SRS resource set to be obtained based on uplink transmission CSI, and each SRS resource set may include two SRS resources. The number of ports included in the two SRS resources may be the same, which may be ports 1, 2, and 4. The two SRS resources may be configured to correspond to different beams.

The network side may obtain uplink channel information by measuring SRSs on different SRS resources, select a spatial relation, precoding matrix, power control, MCS, and other parameters for the UE based on the uplink channel information, and schedule an SRI field/TPMI field/TPC field/MCS field in DCI format0_1/0_2 of PUSCH to indicate the transmission parameters to the UE. A spatial relation and port same as those of an SRS resource indicated by the SRI field can be used for PUSCH transmission.

Optionally, for non-codebook-based transmission, four SRS resources may be configured in each SRS resource set for non-codebook-based transmission, and the number of ports for all SRS resources may be 1. An associated CSI-RS can be configured for each SRS resource set and is used for downlink channel measurement by the UE. According to channel reciprocity, the UE may assume a downlink channel under measurement as an uplink channel, and may calculate a precoding matrix for uplink transmission based on the channel information and use the precoding matrix to precode SRS and send the precoded SRS to the network side. Through measurement on the precoded SRS, the network side may determine precoding used for PUSCH transmission by the UE, and performs indication by using the SRI field in the DCI for PUSCH scheduling. That is, the SRI field may indicate a subset of all precoded SRS resources sent by the UE to indicate a precoding matrix to be used for PUSCH transmission.

Optionally, the network side may use SRS resource indication information in the first indication information to indicate an SRS resource, so that the terminal performs PUSCH transmission by using a same spatial relation and port as the SRS resource.

Optionally, the network side may use the TPMI indication information in the first indication information to indicate a precoding matrix, so that the terminal uses the precoding matrix to precode the SRS.

Optionally, the network side may indicate a PTRS transmit port by using the PTRS transmit port indication information in the first indication information, and uses the PTRS-DMRS association field to indicate at which layer the PTRS is uploaded.

Optionally, one layer may correspond to one DM-RS port.

Optionally, the network side may indicate corresponding information in a resource configuration for PUSCH transmission by using any one or a combination of the TPMI indication information, PTRS transmit port indication information, and TPMI indication information in the first indication information.

Optionally, after the target transmission resource configuration is determined, that is, after the resource configuration for PUSCH transmission is determined, PUSCH transmission may be performed based on the resource configuration for PUSCH transmission.

In this embodiment of this application, the target transmission resource configuration for PUSCH transmission is indicated to the terminal by using at least one of the SRS resource indication information, the TPMI indication information, and the PTRS transmit port indication information, so as to reduce bit overheads for the SRI field and/or TPMI field for the PUSCH transmission resource configuration.

It should be noted that, for the PUSCH transmission method provided in the embodiments of this application, the execution body may be a PUSCH transmission apparatus, or a control module for executing the PUSCH transmission method in the PUSCH transmission apparatus. In the embodiments of this application, the PUSCH transmission apparatus provided in the embodiments of this application is described by using the PUSCH transmission method being executed by the PUSCH transmission apparatus as an example.

FIG. 4 is a first schematic structural diagram of a PUSCH transmission apparatus according to an embodiment of this application. As shown in FIG. 4, the apparatus includes: a first determining module 410 and a first transmission module 420.

The first determining module 410 is configured to determine, based on first indication information that is received, a target transmission resource configuration indicated by the first indication information from at least one transmission resource configuration.

The first transmission module 420 is configured to perform PUSCH transmission based on the target transmission resource configuration.

The first indication information includes at least one of the following:

sounding reference signal SRS resource indication information;
precoding matrix indicator TPMI indication information; and
phase tracking reference signal PTRS transmit port indication information.

The at least one transmission resource configuration is determined based on at least one of the following:

pre-indication by a network side;
pre-definition by a protocol;
pre-configuration;

indication by an RRC layer; and
indication by a MAC layer.

Optionally, the PUSCH transmission apparatus determines, based on the received first indication information by using the first determining module 410, the target transmission resource configuration indicated by the first indication information from the at least one transmission resource configuration, and then may perform PUSCH transmission based on the target transmission resource configuration by using the first transmission module 420.

It should be noted is that the foregoing apparatus provided in this embodiment of this application can implement all steps of the method implemented in the foregoing method embodiments, with the same technical effects achieved. For the same content and beneficial effects of this embodiment as the method embodiments, details are not described herein again.

In this embodiment of this application, the target transmission resource configuration for PUSCH transmission is indicated to the terminal by using at least one of the SRS resource indication information, the TPMI indication information, and the PTRS transmit port indication information, so as to reduce bit overheads for the SRI field and/or TPMI field for the PUSCH transmission resource configuration.

Optionally, the SRS resource indication information includes a codepoint value in an SRI field.

the first determining module is further configured to:

based on the codepoint value in the SRI field of the DCI, determine target SRI field codepoint information in at least one piece of SRI field codepoint information; where the at least one piece of SRI field codepoint information is determined by the terminal based on at least one of the following:

pre-indication by a network side;
pre-definition by a protocol;
pre-configuration;
indication by an RRC layer; and
indication by a MAC layer.

The SRI field codepoint information is associated with at least one SRS resource, or the SRI field codepoint information is associated with at least one SRS resource group.

Optionally, different codepoint values in the SRI field are in one-to-one correspondence to the at least one piece of SRI field codepoint information; and a correspondence between the different codepoint values in the SRI field and the at least one piece of SRI field codepoint information is pre-indicated by a network side, pre-defined by a protocol, pre-configured, or indicated by second signaling, where the second signaling is RRC layer signaling or MAC layer signaling.

Optionally, multiple SRS resources or resource groups associated with the SRI field codepoint information belong to different SRS resource sets (SRS resource sets).

Optionally, SRS resources in each SRS resource group belong to the same SRS resource set.

Optionally, the first determining module is further configured to:

determine the number of bits in the SRI field based on the number of pieces of the at least one piece of SRI field codepoint information; and
determine, based on the number of bits in the SRI field, a value range of the codepoint value in the SRI field of the DCI.

Optionally, the first transmission module is further configured to:

determine, based on the target transmission resource configuration, an SRS resource associated with a repetition occasion of PUSCH; and perform PUSCH transmission based on the SRS resource associated with the repetition occasion.

Optionally, the first transmission module is further configured to:

determine a mapping manner between PUSCH transmission occasions and at least one SRS resource or resource group associated with the target SRI field codepoint information; and determine, based on the mapping manner, an SRS resource associated with the repetition occasion of the PUSCH.

Optionally, in a case that the number of PUSCH repetitions is greater than or equal to 2, the mapping manner includes:

the at least one SRS resource or resource group is alternately or sequentially mapped to a plurality of repetition occasions of PUSCH.

Optionally, in a case that the number of PUSCH repetitions is 1, the mapping manner includes:

sequentially performing one-to-one mapping of the at least one SRS resource or resource group to a plurality of partial repetition occasions in one repetition occasion of PUSCH, where the plurality of partial repetition occasions form the one repetition occasion.

Optionally, a sequence of the at least one SRS resource or resource group is determined based on an association sequence in the target SRI field codepoint information.

Optionally, a sequence of the at least one SRS resource or resource group is determined based on an index (SRS resource set ID) of an SRS resource set to which the at least one SRS resource or resource group belongs.

Optionally, different SRS resource sets are associated with different CORESETPoolIndex; and different DCIs are from CORESETs associated with the different CORESET-PoolIndex.

Optionally, the PTRS transmit port indication information includes indication information in a PTRS-DMRS association field.

The first determining module is further configured to:

determine, based on third signaling of an RRC layer or a MAC layer, indication information in a PTRS-DMRS association field of DCI; and determine, based on the indication information in the PTRS-DMRS association field, a target association relationship in at least one association relationship between PTRS ports and DMRS transmit port; where the DMRS transmit port is associated with an SRS resource or SRS resource group for PUSCH transmission.

Optionally, the third signaling includes:

the maximum number of PTRS ports; and the maximum number of transmission ranks and/or SRS ports.

Optionally, the first determining module is further configured to:

determine, based on the third signaling, the number of bits of the indication information in the PTRS-DMRS association field of the DCI; and determine, based on the number of bits of the indication information in the PTRS-DMRS association field, a value range of the indication information in the PTRS-DMRS association field of the DCI.

Optionally, the indication information in the PTRS-DMRS association field includes a second value of the PTRS-DMRS association field; and different second values are in one-to-one correspondence to the at least one association relationship.

Optionally, the first determining module is further configured to:

determine, based on the second value of the PTRS-DMRS association field, that an association relationship corresponding to the second value is the target association relationship.

Optionally, the first determining module is further configured to:

in a case that the maximum number of PTRS ports is 1 or 2 and the maximum number of transmission ranks is 2, determine that the number of bits of the indication information in the PTRS-DMRS association field is 2 bits.

Optionally, the second value of the indication information in the PTRS-DMRS association field includes a third value of the most significant bit MSB and a fourth value of the least significant bit LSB.

Optionally, the third value of the most significant bit MSB includes 0 or 1.

In a case that the third value of the most significant bit MSB is 0, the target association relationship includes: PTRS port 0 is associated with the $1^{st}$ scheduled DM-RS port associated with a first SRS resource or SRS resource group; and in a case that the third value of the most significant bit MSB is 1, the target association relationship includes: PTRS port 0 is associated with the $2^{nd}$ scheduled DM-RS port associated with the first SRS resource or SRS resource group.

Optionally, the fourth value of the least significant bit LSB includes 0 or 1.

In a case that the fourth value of the least significant bit LSB is 0, the target association relationship includes: PTRS port 0 is associated with the $1^{st}$ scheduled DM-RS port associated with a second SRS resource or SRS resource group; and in a case that the fourth value of the least significant bit LSB is 1, the target association relationship includes: PTRS port 0 is associated with the $2^{nd}$ scheduled DM-RS port associated with the second SRS resource or SRS resource group.

Optionally, in a case that all repetition occasions of the PUSCH are associated with one SRS resource or SRS resource group, the first determining module is further configured to:

determine, based on information about part of bits of the indication information in the PTRS-DMRS association field, the target association relationship in the at least one association relationship between PTRS ports and DMRS transmit ports; where the part of bits are an MSB or LSB.

Optionally, the first determining module is further configured to:

in a case that the maximum number of PTRS ports is 1 and the maximum number of transmission ranks is 3 or 4, determine that the number of bits of the indication information in the PTRS-DMRS association field is 4 bits.

Optionally, the second value of the indication information in the PTRS-DMRS association field includes a fifth value of the most significant bit MSB and a sixth value of the least significant bit LSB; and the most significant bit MSB is 2 bits, and the least significant bit LSB is 2 bits.

Optionally, the fifth value of the most significant bit MSB is 0, 1, 2, or 3.

In a case that the fifth value of the most significant bit MSB is 0, the target association relationship includes: PTRS port 0 is associated with the $1^{st}$ scheduled DM-RS port associated with a first SRS resource or SRS resource group;

in a case that the fifth value of the most significant bit MSB is 1, the target association relationship includes: PTRS port 0 is associated with the $2^{nd}$ scheduled DM-RS port associated with the first SRS resource or SRS resource group;

in a case that the fifth value of the most significant bit MSB is 2, the target association relationship includes: PTRS port 0 is associated with the $3^{rd}$ scheduled DM-RS port associated with the first SRS resource or SRS resource group; and in a case that the fifth value of the most significant bit MSB is 3, the target association relationship includes: PTRS port 0 is associated with the 4th scheduled DM-RS port associated with the first SRS resource or SRS resource group.

Optionally, the sixth value of the least significant bit LSB is 0, 1, 2, or 3.

In a case that the sixth value of the least significant bit LSB is 0, the target association relationship includes: TRS port 0 is associated with the $1^{st}$ scheduled DM-RS port associated with a second SRS resource or SRS resource group;

in a case that the sixth value of the least significant bit LSB is 1, the target association relationship includes: TRS port 0 is associated with the $2^{nd}$ scheduled DM-RS port associated with the second SRS resource or SRS resource group;

in a case that the sixth value of the least significant bit LSB is 2, the target association relationship includes: PTRS port 0 is associated with the $3^{rd}$ scheduled DM-RS port associated with the second SRS resource or SRS resource group; and in a case that the sixth value of the least significant bit LSB is 3, the target association relationship includes: PTRS port 0 is associated with the 4th scheduled DM-RS port associated with the second SRS resource or SRS resource group.

Optionally, in a case that all repetition occasions of the PUSCH are associated with one SRS resource or SRS resource group, the first determining module is further configured to:

determine, based on information about part of bits of the indication information in the PTRS-DMRS association field, the target association relationship in the at least one association relationship between PTRS ports and DMRS transmit ports; where the part of bits are an MSB.

Optionally, the first determining module is further configured to:

in a case that the maximum number of PTRS ports is 2 and the maximum number of transmission ranks is 3 or 4, determine that the number of bits of the indication information in the PTRS-DMRS association field is 4 bits.

Optionally, the second value of the indication information in the PTRS-DMRS association field includes a seventh value of a first bit, an eighth value of a second bit, a ninth value of a third bit, and a tenth value of a fourth bit.

Optionally, the seventh value of the first bit includes 0 or 1.

In a case that the seventh value of the first bit is 0, the target association relationship includes: shared PTRS port 0 is associated with the $1^{st}$ scheduled DM-RS port associated with a first SRS resource or SRS resource group; and in a case that the seventh value of the first bit is 1, the target association relationship includes: shared PTRS port 0 is associated with the $2^{nd}$ scheduled DM-RS port associated with the first SRS resource or SRS resource group.

Optionally, the eighth value of the second bit includes 0 or 1.

In a case that the eighth value of the second bit is 0, the target association relationship includes: shared PTRS port 1 is associated with the $1^{st}$ scheduled DM-RS port associated with a first SRS resource or SRS resource group; and in a case that the eighth value of the second bit is 1, the target association relationship includes: shared PTRS port 1 is associated with the $2^{nd}$ scheduled DM-RS port associated with the first SRS resource or SRS resource group.

Optionally, the ninth value of the third bit includes 0 or 1.

In a case that the ninth value of the third bit is 0, the target association relationship includes: shared PTRS port 0 is associated with the $1^{st}$ scheduled DM-RS port associated with a second SRS resource or SRS resource group; and in a case that the ninth value of the third bit is 1, the target association relationship includes: shared PTRS port 0 is associated with the $2^{nd}$ scheduled DM-RS port associated with the second SRS resource or SRS resource group.

Optionally, the tenth value of the fourth bit includes 0 or 1.

In a case that the tenth value of the fourth bit is 0, the target association relationship includes: shared PTRS port 1 is associated with the $1^{st}$ scheduled DM-RS port associated with a second SRS resource or SRS resource group; and in a case that the tenth value of the fourth bit is 1, the target association relationship includes: shared PTRS port 1 is associated with the $2^{nd}$ scheduled DM-RS port associated with the second SRS resource or SRS resource group.

Optionally, in a case that all repetition occasions of the PUSCH are associated with one SRS resource or SRS resource group, the first determining module is further configured to:

determine, based on information about part of bits of the indication information in the PTRS-DMRS association field, the target association relationship in the at least one association relationship between PTRS ports and DMRS transmit ports; where the part of bits include the first bit and the second bit.

Optionally, in a case that the first indication information includes TPMI indication information, the first transmission module is further configured to:

perform transmission based on a first transmission mode or a second transmission mode by using one or more target TPMIs indicated by the TPMI indication information.

Optionally, the first transmission mode includes:

a first TPMI in the one or more target TPMIs is used for transmission for all PUSCH transmission occasions associated with different SRS resources or SRS resource groups.

Optionally, the first TPMI is determined based on the TPMI indication information.

The TPMI indication information includes:

TPMI field related information in DCI; and/or fourth signaling sent by an RRC layer or a MAC layer.

Optionally, the second transmission mode includes:

different TPMIs in the one or more target TPMIs are used for transmission for PUSCH transmission occasions associated with different SRS resources or SRS resource groups.

Optionally, that different TPMIs in the one or more target TPMIs are used for transmission for PUSCH transmission occasions associated with different SRS resources or SRS resource groups includes:

the SRS resources or SRS resource groups associated with the PUSCH transmission occasions are in one-to-one correspondence to the TPMIs used for the PUSCH transmission occasions.

Optionally, that different TPMIs in the one or more target TPMIs are used for transmission for PUSCH transmission occasions associated with different SRS resources or SRS resource groups includes:

the TPMIs used for the PUSCH transmission occasions associated with different SRS resources or SRS resource groups are determined based on the TPMI indication information.

The TPMI indication information includes:

TPMI field related information in DCI; and/or fifth signaling sent by an RRC layer or a MAC layer.

Optionally, the first transmission module is further configured to:

based on sixth signaling, determine to perform transmission based on the first transmission mode by using one or more target TPMIs; or based on sixth signaling, determine to perform transmission based on the second transmission mode by using one or more target TPMIs; where the sixth signaling is RRC layer signaling and/or MAC layer signaling.

Optionally, the sixth signaling includes RRC configuration information and/or MAC CE indication signaling.

Optionally, the SRS resource indication information and/or TPMI indication information is associated with first signaling.

Optionally, an association relationship between the TPMI indication information and the first signaling includes:

in a case that all SRI field codepoint information contained in the first signaling is associated with only one SRS resource or SRS resources associated with all the SRI field codepoint information belong to one SRS resource set, the TPMI indication information is in one-to-one correspondence to PUSCH repetition occasions.

In this embodiment of this application, the target transmission resource configuration for PUSCH transmission is indicated to the terminal by using at least one of the SRS resource indication information, the TPMI indication information, and the PTRS transmit port indication information, so as to reduce bit overheads for the SRI field and/or TPMI field for the PUSCH transmission resource configuration.

The PUSCH transmission apparatus in this embodiment of this application may be an apparatus or an electric device having an operating system, or may be a component, an integrated circuit, or a chip in a terminal. The electric device may be a mobile terminal or a non-mobile terminal. For example, the mobile terminal may include but is not limited to the types of the terminal 11 listed above, and the non-mobile terminal may be a server, a network attached storage (NAS), a personal computer (PC), a television (TV), a teller machine, a self-service machine, or the like, which is not specifically limited in this embodiment of this application.

The PUSCH transmission apparatus provided in this embodiment of this application can implement the processes implemented in the method embodiment in FIG. 2, with the same technical effects achieved. To avoid repetition, details are not described herein again.

Figure 5:
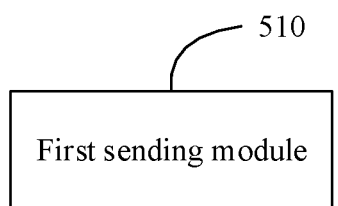
FIG. 5 is a second schematic flowchart of a PUSCH transmission apparatus according to an embodiment of this application.

FIG. 5 is a second schematic structural diagram of a PUSCH transmission apparatus according to an embodiment of this application. As shown in FIG. 5, the apparatus includes: a first sending module 510.

The first sending module 510 is configured to send first indication information to a terminal.

The first indication information is used to instruct the terminal to determine a target transmission resource configuration indicated by the first indication information from at least one transmission resource configuration; and the first indication information includes at least one of the following:

sounding reference signal SRS resource indication information;

precoding matrix indicator TPMI indication information; and phase tracking reference signal PTRS transmit port indication information.

The at least one transmission resource configuration is determined based on at least one of the following:

pre-indication by a network side;

pre-definition by a protocol;

pre-configuration;

indication by an RRC layer; and indication by a MAC layer.

Optionally, the PUSCH transmission apparatus sends the first indication information to the terminal by using the first sending module 510, so as to instruct the terminal to determine the target transmission resource configuration indicated by the first indication information from the at least one transmission resource configuration.

It should be noted is that the foregoing apparatus provided in this embodiment of this application can implement all steps of the method implemented in the foregoing method embodiments, with the same technical effects achieved. For the same content and beneficial effects of this embodiment as the method embodiments, details are not described herein again.

In this embodiment of this application, the target transmission resource configuration for PUSCH transmission is indicated to the terminal by using at least one of the SRS resource indication information, the TPMI indication information, and the PTRS transmit port indication information, so as to reduce bit overheads for the SRI field and/or TPMI field for the PUSCH transmission resource configuration.

Optionally, the SRS resource indication information includes a codepoint value in an SRI field.

The codepoint value in the SRI field is used to indicate target SRI field codepoint information in at least one piece of SRI field codepoint information; where the at least one piece of SRI field codepoint information is determined by the terminal based on at least one of the following:

pre-indication by a network side;

pre-definition by a protocol;

pre-configuration;

indication by an RRC layer; and indication by a MAC layer.

The SRI field codepoint information is associated with at least one SRS resource (SRS resource), or the SRI field codepoint information is associated with at least one SRS resource group (SRS resource group).

Optionally, different codepoint values in the SRI field are in one-to-one correspondence to the at least one piece of SRI field codepoint information; and a correspondence between the different codepoint values in the SRI field and the at least one piece of SRI field codepoint information is pre-indicated by a network side, pre-defined by a protocol, pre-configured, or indicated by second signaling, where the second signaling is RRC layer signaling or MAC layer signaling.

Optionally, multiple SRS resources or resource groups associated with the SRI field codepoint information belong to different SRS resource sets (SRS resource sets).

Optionally, SRS resources in each SRS resource group belong to the same SRS resource set.

Optionally, a sequence of the at least one SRS resource or resource group is determined based on an association sequence in the target SRI field codepoint information.

Optionally, a sequence of the at least one SRS resource or resource group is determined based on an index (SRS resource set ID) of an SRS resource set to which the at least one SRS resource or resource group belongs.

Optionally, different SRS resource sets are associated with different CORESETPoolIndex; and different DCIs are from CORESETs associated with the different CORESETPoolIndex.

Optionally, the PTRS transmit port indication information includes indication information in a PTRS-DMRS association field.

The indication information in the PTRS-DMRS association field is used for determining a target association relationship in at least one association relationship between PTRS ports and DMRS transmit port.

The DMRS transmit port is associated with an SRS resource or SRS resource group for PUSCH transmission.

Optionally, the third signaling includes:

the maximum number of PTRS ports; and the maximum number of transmission ranks and/or SRS ports.

Optionally, the indication information in the PTRS-DMRS association field includes a second value of the PTRS-DMRS association field; and different second values are in one-to-one correspondence to the at least one association relationship.

Optionally, in a case that the maximum number of PTRS ports is 1 or 2 and the maximum number of transmission ranks is 2, determining that the number of bits of the indication information in the PTRS-DMRS association field is 2 bits.

Optionally, the second value of the indication information in the PTRS-DMRS association field includes a third value of the most significant bit MSB and a fourth value of the least significant bit LSB.

Optionally, the third value of the most significant bit MSB includes 0 or 1.

In a case that the third value of the most significant bit MSB is 0, the target association relationship includes: PTRS port 0 is associated with the $1^{st}$ scheduled DM-RS port associated with a first SRS resource or SRS resource group; and in a case that the third value of the most significant bit MSB is 1, the target association relationship includes: PTRS port 0 is associated with the $2^{nd}$ scheduled DM-RS port associated with the first SRS resource or SRS resource group.

Optionally, the fourth value of the least significant bit LSB includes 0 or 1.

In a case that the fourth value of the least significant bit LSB is 0, the target association relationship includes: PTRS port 0 is associated with the $1^{st}$ scheduled DM-RS port associated with a second SRS resource or SRS resource group; and in a case that the fourth value of the least significant bit LSB is 1, the target association relationship includes: PTRS port 0 is associated with the $2^{nd}$ scheduled DM-RS port associated with the second SRS resource or SRS resource group.

Optionally, in a case that the maximum number of PTRS ports is 1 and the maximum number of transmission ranks is 3 or 4, determining that the number of bits of the indication information in the PTRS-DMRS association field is 4 bits.

Optionally, the second value of the indication information in the PTRS-DMRS association field includes a fifth value of the most significant bit MSB and a sixth value of the least significant bit LSB; and the most significant bit MSB is 2 bits, and the least significant bit LSB is 2 bits.

Optionally, the fifth value of the most significant bit MSB is 0, 1, 2, or 3.

In a case that the fifth value of the most significant bit MSB is 0, the target association relationship includes: PTRS port 0 is associated with the $1^{st}$ scheduled DM-RS port associated with a first SRS resource or SRS resource group;

in a case that the fifth value of the most significant bit MSB is 1, the target association relationship includes: PTRS port 0 is associated with the $2^{nd}$ scheduled DM-RS port associated with the first SRS resource or SRS resource group;

in a case that the fifth value of the most significant bit MSB is 2, the target association relationship includes: PTRS port 0 is associated with the $3^{rd}$ scheduled DM-RS port associated with the first SRS resource or SRS resource group; and in a case that the fifth value of the most significant bit MSB is 3, the target association relationship includes: PTRS port 0 is associated with the 4th scheduled DM-RS port associated with the first SRS resource or SRS resource group.

Optionally, the sixth value of the least significant bit LSB is 0, 1, 2, or 3.

in a case that the sixth value of the least significant bit LSB is 0, the target association relationship includes: TRS port 0 is associated with the $1^{st}$ scheduled DM-RS port associated with a second SRS resource or SRS resource group;

in a case that the sixth value of the least significant bit LSB is 1, the target association relationship includes: TRS port 0 is associated with the $2^{nd}$ scheduled DM-RS port associated with the second SRS resource or SRS resource group;

in a case that the sixth value of the least significant bit LSB is 2, the target association relationship includes: PTRS port 0 is associated with the $3^{rd}$ scheduled DM-RS port associated with the second SRS resource or SRS resource group; and in a case that the sixth value of the least significant bit LSB is 3, the target association relationship includes: PTRS port 0 is associated with the 4th scheduled DM-RS port associated with the second SRS resource or SRS resource group.

Optionally, in a case that the maximum number of PTRS ports is 2 and the maximum number of transmission ranks is 3 or 4, it is determined that the number of bits of the indication information in the PTRS-DMRS association field is 4 bits.

Optionally, the second value of the indication information in the PTRS-DMRS association field includes a seventh value of a first bit, an eighth value of a second bit, a ninth value of a third bit, and a tenth value of a fourth bit.

Optionally, the seventh value of the first bit includes 0 or 1.

In a case that the seventh value of the first bit is 0, the target association relationship includes: shared PTRS port 0 is associated with the $1^{st}$ scheduled DM-RS port associated with a first SRS resource or SRS resource group; and in a case that the seventh value of the first bit is 1, the target association relationship includes: shared PTRS port 0 is associated with the $2^{nd}$ scheduled DM-RS port associated with the first SRS resource or SRS resource group.

Optionally, the eighth value of the second bit includes 0 or 1.

In a case that the eighth value of the second bit is 0, the target association relationship includes: shared PTRS port 1 is associated with the $1^{st}$ scheduled DM-RS port associated with a first SRS resource or SRS resource group; and in a case that the eighth value of the second bit is 1, the target association relationship includes: shared PTRS port 1 is associated with the $2^{nd}$ scheduled DM-RS port associated with the first SRS resource or SRS resource group.

Optionally, the ninth value of the third bit includes 0 or 1.

In a case that the ninth value of the third bit is 0, the target association relationship includes: shared PTRS port 0 is associated with the $1^{st}$ scheduled DM-RS port associated with a second SRS resource or SRS resource group; and in a case that the ninth value of the third bit is 1, the target association relationship includes: shared PTRS port 0 is associated with the $2^{nd}$ scheduled DM-RS port associated with the second SRS resource or SRS resource group.

Optionally, the tenth value of the fourth bit includes 0 or 1.

In a case that the tenth value of the fourth bit is 0, the target association relationship includes: shared PTRS port 1 is associated with the $1^{st}$ scheduled DM-RS port associated with a second SRS resource or SRS resource group; and in a case that the tenth value of the fourth bit is 1, the target association relationship includes: shared PTRS port 1 is associated with the $2^{nd}$ scheduled DM-RS port associated with the second SRS resource or SRS resource group.

Optionally, an association relationship between the TPMI indication information and the first signaling includes:

in a case that all SRI field codepoint information contained in the first signaling is associated with only one SRS resource or SRS resources associated with all the SRI field codepoint information belong to one SRS resource set, the TPMI indication information is in one-to-one correspondence to PUSCH repetition occasions.

In this embodiment of this application, the target transmission resource configuration for PUSCH transmission is indicated to the terminal by using at least one of the SRS resource indication information, the TPMI indication information, and the PTRS transmit port indication information, so as to reduce bit overheads for the SRI field and/or TPMI field for the PUSCH transmission resource configuration.

The PUSCH transmission apparatus in this embodiment of this application may be an apparatus, or may be a component, an integrated circuit, or a chip in the terminal. The apparatus may be a mobile terminal or a non-mobile terminal. For example, the mobile terminal may include but is not limited to the types of the terminal 11 listed above, and the non-mobile terminal may be a server, a network attached storage (N NAS), a personal computer (PC), a television (TV), a teller machine, a self-service machine, or the like, which is not specifically limited in this embodiment of this application.

The PUSCH transmission apparatus in this embodiment of this application may be an apparatus having an operating system. The operating system may be an Android operating system, an iOS operating system, or other possible operating systems, and is not specifically limited in the embodiments of this application.

The PUSCH transmission apparatus provided in this embodiment of this application can implement the processes implemented in the method embodiment in FIG. 3, with the same technical effects achieved. To avoid repetition, details are not described herein again.

Figure 6:
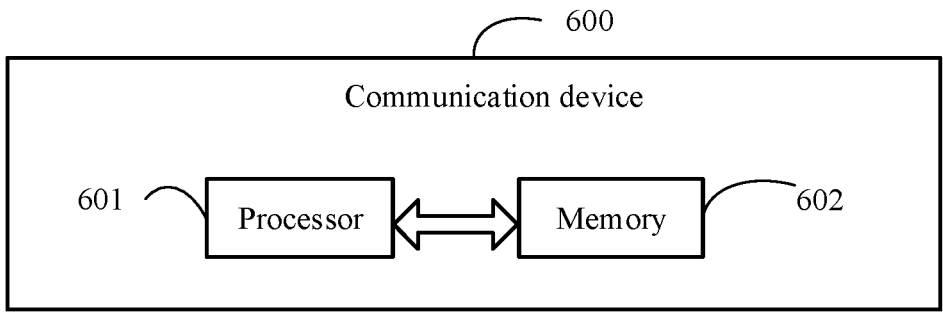
FIG. 6 is a schematic structural diagram of a communication device according to an embodiment of this application.

Optionally, FIG. 6 is a schematic structural diagram of a communication device provided in an embodiment of this application. As shown in FIG. 6, the communication device 600 includes a processor 601, a memory 602, and a program or instructions stored in the memory 602 and capable of running on the processor 601. For example, when the communication device 600 is a terminal and when the program or the instructions are executed by the processor 601, the processes of the foregoing method embodiments are implemented, with the same technical effects achieved. When the communication device 600 is a network-side device and when the program or the instructions are executed by the processor 601, the processes of the foregoing method embodiments are implemented, with the same technical effects achieved. To avoid repetition, details are not described herein again.

Figure 7:
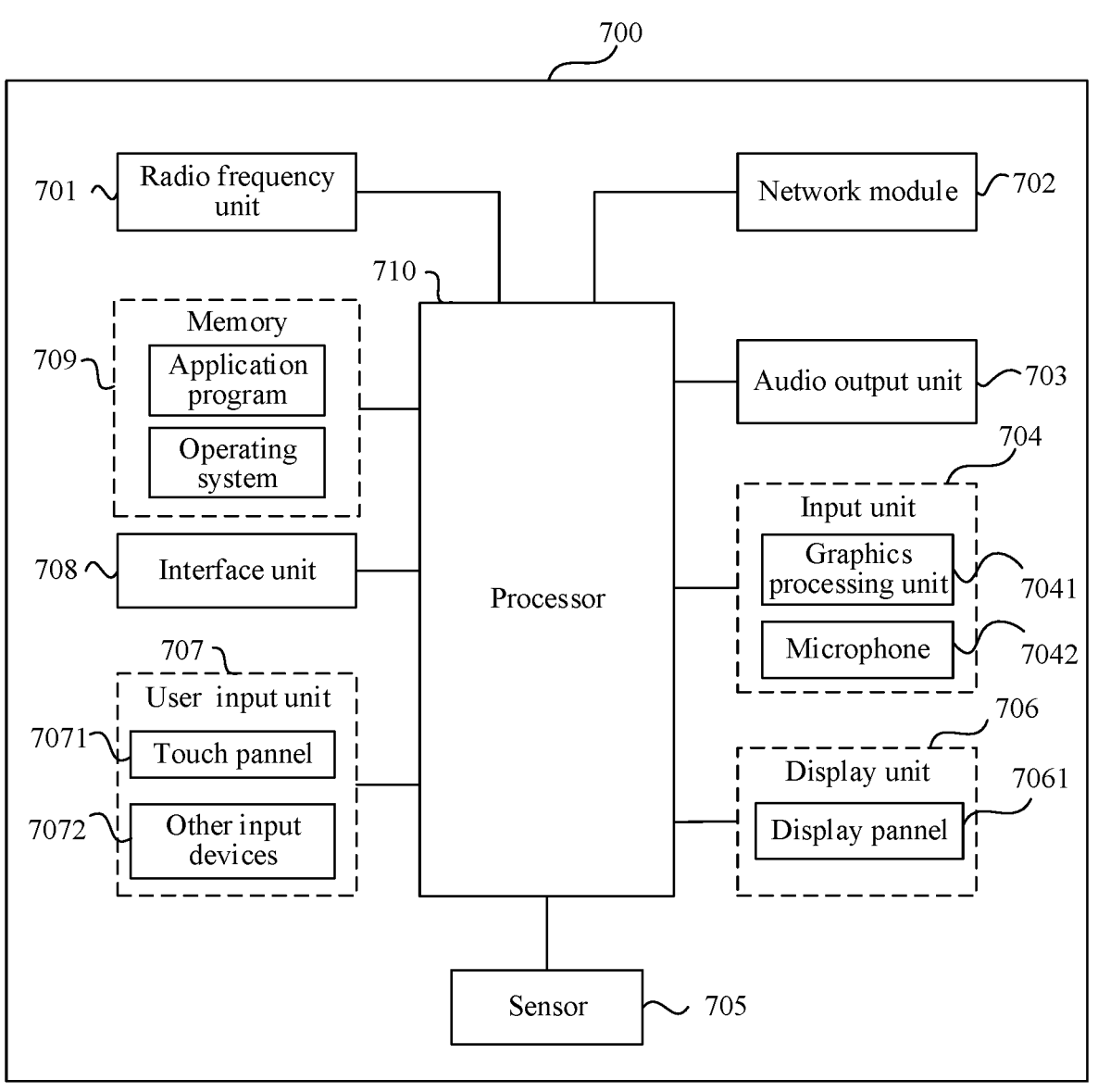
FIG. 7 is a schematic diagram of a hardware structure of a terminal device according to an embodiment of this application.

FIG. 7 is a schematic diagram of a hardware structure of a terminal device according to an embodiment of this application.

The terminal 700 includes but is not limited to at least part of components such as a radio frequency unit 701, a network module 702, an audio output unit 703, an input unit 704, a sensor 705, a display unit 706, a user input unit 707, an interface unit 708, a memory 709, and a processor 710.

Persons skilled in the art can understand that the terminal 700 may further include a power supply (for example, a battery) supplying power to the components, and the power supply may be logically connected to the processor 710 through a power management system. In this way, functions such as charge management, discharge management, and power consumption management are implemented by using the power management system. The structure of the terminal shown in FIG. 7 does not constitute any limitation on the terminal. The terminal may include more or fewer components than those shown in the figure, or a combination of some components, or the components disposed differently. Details are not described herein again.

It can be understood that in this embodiment of this application, the input unit 704 may include a graphics processing unit (Graphics Processing Unit, GPU) 7041 and a microphone 7042. The graphics processing unit 7041 processes image data of a still picture or video obtained by an image capture apparatus (such as a camera) in a video capture mode or an image capture mode. The display unit 706 may include a display panel 7061, and the display panel 7061 may be configured in a form of a liquid crystal display, an organic light-emitting diode, and the like. The user input unit 707 may include a touch panel 7071 and other input devices 7072. The touch panel 7071 is also referred to as a touchscreen. The touch panel 7071 may include two parts: a touch detection apparatus and a touch controller. The other input devices 7072 may include but are not limited to a physical keyboard, a function key (such as a volume control key or a power on/off key), a trackball, a mouse, a joystick, and the like. Details are not described herein.

In this embodiment of this application, the radio frequency unit 701 receives information from the communication peer and sends it to the processor 710 for processing; and sends the information to be transmitted to the communication peer. Generally, the radio frequency unit 701 includes but is not limited to an antenna, at least one amplifier, a transceiver, a coupler, a low noise amplifier, a duplexer, and the like.

The memory 709 may be configured to store software programs or instructions and various data. The memory 709 may include a program or instruction storage area and a data storage area. The program or instruction storage area may store an operating system, an application program or instruction required by at least one function (for example, a sound playback function or an image playback function), and the like. In addition, the memory 709 may include a high-speed random access memory, and may further include a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage device, a flash memory device, or another volatile solid-state storage device.

The processor 710 may include one or more processing units. Optionally, an application processor and a modem processor may be integrated in the processor 710. The application processor primarily processes an operating system, user interfaces, application programs or instructions, and the like. The modem processor primarily processes radio communication, for example, being a baseband processor. It can be understood that the modem processor may alternatively be not integrated in the processor 710.

The processor 710 is configured to:

determine, for a terminal based on first indication information that is received, a target transmission resource configuration indicated by the first indication information from at least one transmission resource configuration; and perform PUSCH transmission based on the target transmission resource configuration; where The first indication information includes at least one of the following:

sounding reference signal SRS resource indication information;

precoding matrix indicator TPMI indication information; and phase tracking reference signal PTRS transmit port indication information.

The at least one transmission resource configuration is determined based on at least one of the following:

pre-indication by a network side;

pre-definition by a protocol;

pre-configuration;

indication by an RRC layer; and indication by a MAC layer.

In this embodiment of this application, the target transmission resource configuration for PUSCH transmission is indicated to the terminal by using at least one of the SRS resource indication information, the TPMI indication information, and the PTRS transmit port indication information, so as to reduce bit overheads for the SRI field and/or TPMI field for the PUSCH transmission resource configuration.

Optionally, the SRS resource indication information includes a codepoint value in an SRI field.

Optionally, the determining, by the terminal based on the first indication information in the DCI, the target transmission resource configuration indicated by the first indication information includes:

based on the codepoint value in the SRI field of the DCI, determining target SRI field codepoint information in at least one piece of SRI field codepoint information; where the at least one piece of SRI field codepoint information is determined by the terminal based on at least one of the following:

pre-indication by a network side;

pre-definition by a protocol;

pre-configuration;

indication by an RRC layer; and indication by a MAC layer.

The SRI field codepoint information is associated with at least one SRS resource, or the SRI field codepoint information is associated with at least one SRS resource group.

Optionally, different codepoint values in the SRI field are in one-to-one correspondence to the at least one piece of SRI field codepoint information; and a correspondence between the different codepoint values in the SRI field and the at least one piece of SRI field codepoint information is pre-indicated by a network side, pre-defined by a protocol, pre-configured, or indicated by second signaling, where the second signaling is RRC layer signaling or MAC layer signaling.

Optionally, multiple SRS resources or resource groups associated with the SRI field codepoint information belong to different SRS resource sets.

Optionally, SRS resources in each SRS resource group belong to the same SRS resource set.

Optionally, the determining, based on the codepoint value in the SRI field of DCI, target SRI field codepoint information in at least one piece of SRI field codepoint information includes:

determining the number of bits in the SRI field based on the number of pieces of the at least one piece of SRI field codepoint information; and determining, based on the number of bits in the SRI field, a value range of the codepoint value in the SRI field of the DCI.

Optionally, the performing PUSCH transmission based on the target transmission resource configuration includes:

determine, based on the target transmission resource configuration, an SRS resource associated with a repetition occasion of PUSCH; and perform PUSCH transmission based on the SRS resource associated with the repetition occasion.

Optionally, the processor 710 is configured to:

determine a mapping manner between PUSCH transmission occasions and at least one SRS resource or resource group associated with the target SRI field codepoint information; and determine, based on the mapping manner, an SRS resource associated with the repetition occasion of the PUSCH.

Optionally, in a case that the number of PUSCH repetitions is greater than or equal to 2, the mapping manner includes:

the at least one SRS resource or resource group is alternately or sequentially mapped to a plurality of repetition occasions of PUSCH.

Optionally, in a case that the number of PUSCH repetitions is 1, the mapping manner includes:

sequentially performing one-to-one mapping of the at least one SRS resource or resource group to a plurality of partial repetition occasions in one repetition occasion of PUSCH, where the plurality of partial repetition occasions form the one repetition occasion.

Optionally, a sequence of the at least one SRS resource or resource group is determined based on an association sequence in the target SRI field codepoint information.

Optionally, a sequence of the at least one SRS resource or resource group is determined based on an index (SRS resource set ID) of an SRS resource set to which the at least one SRS resource or resource group belongs.

Optionally, different SRS resource sets are associated with different CORESETPoolIndex; and different DCIs are from CORESETs associated with the different CORESETPoolIndex.

Optionally, the PTRS transmit port indication information includes indication information in a PTRS-DMRS association field.

The determining, by the terminal based on the first indication information in the DCI, the target transmission resource configuration indicated by the first indication information includes:

determining, based on third signaling of an RRC layer or a MAC layer, indication information in a PTRS-DMRS association field of DCI; and determining, based on the indication information in the PTRS-DMRS association field, a target association relationship in at least one association relationship between PTRS ports and DMRS transmit port.

The DMRS transmit port is associated with an SRS resource or SRS resource group for PUSCH transmission.

Optionally, the third signaling includes:

the maximum number of PTRS ports; and the maximum number of transmission ranks and/or SRS ports.

Optionally, the determining, based on third signaling of an RRC layer or a MAC layer, indication information in a PTRS-DMRS association field of DCI includes:

determining, based on the third signaling, the number of bits of the indication information in the PTRS-DMRS association field of the DCI; and determining, based on the number of bits of the indication information in the PTRS-DMRS association field, a value range of the indication information in the PTRS-DMRS association field of the DCI.

Optionally, the indication information in the PTRS-DMRS association field includes a second value of the PTRS-DMRS association field; and different second values are in one-to-one correspondence to the at least one association relationship.

Optionally, the processor 710 is configured to:

determine, based on the second value of the PTRS-DMRS association field, that an association relationship corresponding to the second value is the target association relationship.

Optionally, the processor 710 is configured to:

in a case that the maximum number of PTRS ports is 1 or 2 and the maximum number of transmission ranks is 2, determine that the number of bits of the indication information in the PTRS-DMRS association field is 2 bits.

Optionally, the second value of the indication information in the PTRS-DMRS association field includes a third value of the most significant bit MSB and a fourth value of the least significant bit LSB.

Optionally, the third value of the most significant bit MSB includes 0 or 1.

In a case that the third value of the most significant bit MSB is 0, the target association relationship includes: PTRS port 0 is associated with the $1^{st}$ scheduled DM-RS port associated with a first SRS resource or SRS resource group; and in a case that the third value of the most significant bit MSB is 1, the target association relationship includes: PTRS port 0 is associated with the $2^{nd}$ scheduled DM-RS port associated with the first SRS resource or SRS resource group.

Optionally, the fourth value of the least significant bit LSB includes 0 or 1.

In a case that the fourth value of the least significant bit LSB is 0, the target association relationship includes: PTRS port 0 is associated with the $1^{st}$ scheduled DM-RS port associated with a second SRS resource or SRS resource group; and in a case that the fourth value of the least significant bit LSB is 1, the target association relationship includes: PTRS port 0 is associated with the $2^{nd}$ scheduled DM-RS port associated with the second SRS resource or SRS resource group.

Optionally, in a case that all repetition occasions of the PUSCH are associated with one SRS resource or SRS resource group, the processor 710 is configured to:

determine, based on information about part of bits of the indication information in the PTRS-DMRS association field, the target association relationship in the at least one association relationship between PTRS ports and DMRS transmit ports; where the part of bits are an MSB or LSB.

Optionally, the processor 710 is configured to:

in a case that the maximum number of PTRS ports is 1 and the maximum number of transmission ranks is 3 or 4, determine that the number of bits of the indication information in the PTRS-DMRS association field is 4 bits.

Optionally, the second value of the indication information in the PTRS-DMRS association field includes a fifth value of the most significant bit MSB and a sixth value of the least significant bit LSB; and the most significant bit MSB is 2 bits, and the least significant bit LSB is 2 bits.

Optionally, the fifth value of the most significant bit MSB is 0, 1, 2, or 3.

In a case that the fifth value of the most significant bit MSB is 0, the target association relationship includes: PTRS port 0 is associated with the $1^{st}$ scheduled DM-RS port associated with a first SRS resource or SRS resource group;

in a case that the fifth value of the most significant bit MSB is 1, the target association relationship includes: PTRS port 0 is associated with the $2^{nd}$ scheduled DM-RS port associated with the first SRS resource or SRS resource group;

in a case that the fifth value of the most significant bit MSB is 2, the target association relationship includes: PTRS port 0 is associated with the $3^{rd}$ scheduled DM-RS port associated with the first SRS resource or SRS resource group; and in a case that the fifth value of the most significant bit MSB is 3, the target association relationship includes: PTRS port 0 is associated with the 4th scheduled DM-RS port associated with the first SRS resource or SRS resource group.

Optionally, the sixth value of the least significant bit LSB is 0, 1, 2, or 3.

in a case that the sixth value of the least significant bit LSB is 0, the target association relationship includes: TRS port 0 is associated with the 1$^{st}$ scheduled DM-RS port associated with a second SRS resource or SRS resource group; and in a case that the sixth value of the least significant bit LSB is 1, the target association relationship includes: TRS port 0 is associated with the 2$^{nd}$ scheduled DM-RS port associated with the second SRS resource or SRS resource group;

in a case that the sixth value of the least significant bit LSB is 2, the target association relationship includes: PTRS port 0 is associated with the 3$^{rd}$ scheduled DM-RS port associated with the second SRS resource or SRS resource group; and in a case that the sixth value of the least significant bit LSB is 3, the target association relationship includes: PTRS port 0 is associated with the 4th scheduled DM-RS port associated with the second SRS resource or SRS resource group.

Optionally, in a case that all repetition occasions of the PUSCH are associated with one SRS resource or SRS resource group, the processor 710 is configured to:

determine, based on information about part of bits of the indication information in the PTRS-DMRS association field, the target association relationship in the at least one association relationship between PTRS ports and DMRS transmit ports; where the part of bits are an MSB.

Optionally, the processor 710 is configured to:

in a case that the maximum number of PTRS ports is 2 and the maximum number of transmission ranks is 3 or 4, determine that the number of bits of the indication information in the PTRS-DMRS association field is 4 bits.

Optionally, the second value of the indication information in the PTRS-DMRS association field includes a seventh value of a first bit, an eighth value of a second bit, a ninth value of a third bit, and a tenth value of a fourth bit.

Optionally, the seventh value of the first bit includes 0 or 1.

In a case that the seventh value of the first bit is 0, the target association relationship includes: shared PTRS port 0 is associated with the 1$^{st}$ scheduled DM-RS port associated with a first SRS resource or SRS resource group; and in a case that the seventh value of the first bit is 1, the target association relationship includes: shared PTRS port 0 is associated with the 2$^{nd}$ scheduled DM-RS port associated with the first SRS resource or SRS resource group.

Optionally, the eighth value of the second bit includes 0 or 1.

In a case that the eighth value of the second bit is 0, the target association relationship includes: shared PTRS port 1 is associated with the 1$^{st}$ scheduled DM-RS port associated with a first SRS resource or SRS resource group; and includes: shared PTRS port 1 is associated with the 2$^{nd}$ scheduled DM-RS port associated with the first SRS resource or SRS resource group.

Optionally, the ninth value of the third bit includes 0 or 1.

In a case that the ninth value of the third bit is 0, the target association relationship includes: shared PTRS port 0 is associated with the 1$^{st}$ scheduled DM-RS port associated with a second SRS resource or SRS resource group; and in a case that the ninth value of the third bit is 1, the target association relationship includes: shared PTRS port 0 is associated with the 2$^{nd}$ scheduled DM-RS port associated with the second SRS resource or SRS resource group.

Optionally, the tenth value of the fourth bit includes 0 or 1.

In a case that the tenth value of the fourth bit is 0, the target association relationship includes: shared PTRS port 1 is associated with the 1$^{st}$ scheduled DM-RS port associated with a second SRS resource or SRS resource group; and in a case that the tenth value of the fourth bit is 1, the target association relationship includes: shared PTRS port 1 is associated with the 2$^{nd}$ scheduled DM-RS port associated with the second SRS resource or SRS resource group.

Optionally, the processor 710 is configured to:

determine, based on information about part of bits of the indication information in the PTRS-DMRS association field, the target association relationship in the at least one association relationship between PTRS ports and DMRS transmit ports; where the part of bits include the first bit and the second bit.

Optionally, the processor 710 is configured to:

perform transmission based on a first transmission mode or a second transmission mode by using one or more target TPMIs indicated by the TPMI indication information.

Optionally, the first transmission mode includes:

a first TPMI in the one or more target TPMIs is used for transmission for all PUSCH transmission occasions associated with different SRS resources or SRS resource groups.

Optionally, the first TPMI is determined based on the TPMI indication information.

The TPMI indication information includes:

TPMI field related information in DCI; and/or fourth signaling sent by an RRC layer or a MAC layer.

Optionally, the second transmission mode includes:

different TPMIs in the one or more target TPMIs are used for transmission for PUSCH transmission occasions associated with different SRS resources or SRS resource groups.

Optionally, that different TPMIs in the one or more target TPMIs are used for transmission for PUSCH transmission occasions associated with different SRS resources or SRS resource groups includes:

the SRS resources or SRS resource groups associated with the PUSCH transmission occasions are in one-to-one correspondence to the TPMIs used for the PUSCH transmission occasions.

Optionally, that different TPMIs in the one or more target TPMIs are used for transmission for PUSCH transmission occasions associated with different SRS resources or SRS resource groups includes:

the TPMIs used for the PUSCH transmission occasions associated with different SRS resources or SRS resource groups are determined based on the TPMI indication information.

The TPMI indication information includes:

TPMI field related information in DCI; and/or fifth signaling sent by an RRC layer or a MAC layer.

Optionally, the processor 710 is configured to:

based on sixth signaling, determine to perform transmission based on the first transmission mode by using one or more target TPMIs; or based on sixth signaling, determine to perform transmission based on the second transmission mode by using one or more target TPMIs; where the sixth signaling is RRC layer signaling and/or MAC layer signaling.

Optionally, the sixth signaling includes RRC configuration information and/or MAC CE indication signaling.

Optionally, the SRS resource indication information and/or TPMI indication information is associated with first signaling.

Optionally, an association relationship between the TPMI indication information and the first signaling includes:

in a case that all SRI field codepoint information contained in the first signaling is associated with only one SRS resource or SRS resources associated with all the SRI field codepoint information belong to one SRS resource set, the TPMI indication information is in one-to-one correspondence to PUSCH repetition occasions.

In this embodiment of this application, the target transmission resource configuration for PUSCH transmission is indicated to the terminal by using at least one of the SRS resource indication information, the TPMI indication information, and the PTRS transmit port indication information, so as to reduce bit overheads for the SRI field and/or TPMI field for the PUSCH transmission resource configuration.

The terminal device embodiment in the embodiments of this application is a product embodiment corresponding to the foregoing method embodiment, and all the implementations in the foregoing method embodiment are applicable to the terminal device embodiment, with the same or similar technical effects achieved. Details are not repeated herein.

Figure 8:
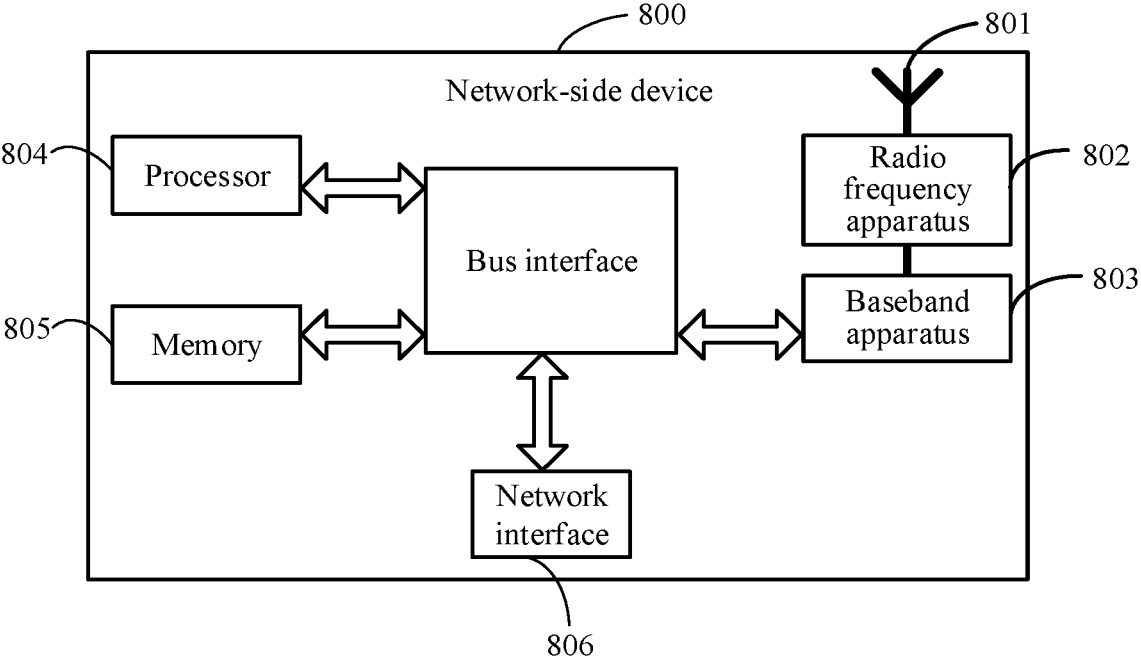
FIG. 8 is a schematic diagram of a hardware structure of a network-side device according to an embodiment of this application.

FIG. 8 is a schematic diagram of a hardware structure of a network-side device according to an embodiment of this application.

As shown in FIG. 8, the network-side device 800 includes an antenna 801, a radio frequency apparatus 802, and a baseband apparatus 803. The antenna 801 is connected to the radio frequency apparatus 802. In an uplink direction, the radio frequency apparatus 802 receives information by using the antenna 801, and sends the received information to the baseband apparatus 803 for processing. In a downlink direction, the baseband apparatus 803 processes to-be-sent information, and sends the information to the radio frequency apparatus 802; and the radio frequency apparatus 802 processes the received information and then sends the information out by using the antenna 801.

The frequency band processing apparatus may be located in the baseband apparatus 803. The method performed by the network-side device in the foregoing embodiments may be implemented in the baseband apparatus 803, and the baseband apparatus 803 includes a processor 804 and a memory 805.

The baseband apparatus 803 may include, for example, at least one baseband board, where a plurality of chips are disposed on the baseband board. As shown in FIG. 8, one of the chips, for example, the processor 804, is connected to the memory 805, to invoke a program in the memory 805 to perform the operation of the network device shown in the foregoing method embodiments.

The baseband apparatus 803 may further include a network interface 806, configured to exchange information with the radio frequency apparatus 802, where the interface is, for example, a common public radio interface (CPRI).

Specifically, the network-side device in this embodiment of this application further includes: instructions or a program stored in the memory 805 and capable of running on the processor 804. The processor 804 invokes the instructions or program in the memory 805 to execute the method executed by the modules shown in FIG. 5, with the same technical effects achieved. To avoid repetition, details are not repeated herein.

The processor 804 is configured to:

send first indication information to a terminal.

The first indication information is used to instruct the terminal to determine a target transmission resource configuration indicated by the first indication information from at least one transmission resource configuration; and The first indication information includes at least one of the following:

sounding reference signal SRS resource indication information;

precoding matrix indicator TPMI indication information; and phase tracking reference signal PTRS transmit port indication information.

The at least one transmission resource configuration is determined based on at least one of the following:

pre-indication by a network side;

pre-definition by a protocol;

pre-configuration;

indication by an RRC layer; and indication by a MAC layer.

In this embodiment of this application, the target transmission resource configuration for PUSCH transmission is indicated to the terminal by using at least one of the SRS resource indication information, the TPMI indication information, and the PTRS transmit port indication information, so as to reduce bit overheads for the SRI field and/or TPMI field for the PUSCH transmission resource configuration.

Optionally, the SRS resource indication information includes a codepoint value in an SRI field.

The codepoint value in the SRI field is used to indicate target SRI field codepoint information in at least one piece of SRI field codepoint information; where the at least one piece of SRI field codepoint information is determined by the terminal based on at least one of the following:

pre-indication by a network side;

pre-definition by a protocol;

pre-configuration;

indication by an RRC layer; and indication by a MAC layer.

The SRI field codepoint information is associated with at least one SRS resource, or the SRI field codepoint information is associated with at least one SRS resource group.

Optionally, different codepoint values in the SRI field are in one-to-one correspondence to the at least one piece of SRI field codepoint information; and a correspondence between the different codepoint values in the SRI field and the at least one piece of SRI field codepoint information is pre-indicated by a network side, pre-defined by a protocol, pre-configured, or indicated by second signaling, where the second signaling is RRC layer signaling or MAC layer signaling.

Optionally, multiple SRS resources or resource groups associated with the SRI field codepoint information belong to different SRS resource sets (SRS resource sets).

Optionally, SRS resources in each SRS resource group belong to the same SRS resource set.

Optionally, a sequence of the at least one SRS resource or resource group is determined based on an association sequence in the target SRI field codepoint information.

Optionally, a sequence of the at least one SRS resource or resource group is determined based on an index (SRS resource set ID) of an SRS resource set to which the at least one SRS resource or resource group belongs.

Optionally, different SRS resource sets are associated with different CORESETPoolIndex; and different DCIs are from CORESETs associated with the different CORESETPoolIndex.

Optionally, the PTRS transmit port indication information includes indication information in a PTRS-DMRS association field.

The indication information in the PTRS-DMRS association field is used for determining a target association relationship in at least one association relationship between PTRS ports and DMRS transmit port.

The DMRS transmit port is associated with an SRS resource or SRS resource group for PUSCH transmission.

Optionally, the third signaling includes:

the maximum number of PTRS ports; and the maximum number of transmission ranks and/or SRS ports.

Optionally, the indication information in the PTRS-DMRS association field includes a second value of the PTRS-DMRS association field; and different second values are in one-to-one correspondence to the at least one association relationship.

Optionally, in a case that the maximum number of PTRS ports is 1 or 2 and the maximum number of transmission ranks is 2, determining that the number of bits of the indication information in the PTRS-DMRS association field is 2 bits.

Optionally, the second value of the indication information in the PTRS-DMRS association field includes a third value of the most significant bit MSB and a fourth value of the least significant bit LSB.

Optionally, the third value of the most significant bit MSB includes 0 or 1.

In a case that the third value of the most significant bit MSB is 0, the target association relationship includes: PTRS port 0 is associated with the $1^{st}$ scheduled DM-RS port associated with a first SRS resource or SRS resource group; and in a case that the third value of the most significant bit MSB is 1, the target association relationship includes: PTRS port 0 is associated with the $2^{nd}$ scheduled DM-RS port associated with the first SRS resource or SRS resource group.

Optionally, the fourth value of the least significant bit LSB includes 0 or 1.

In a case that the fourth value of the least significant bit LSB is 0, the target association relationship includes: PTRS port 0 is associated with the $1^{st}$ scheduled DM-RS port associated with a second SRS resource or SRS resource group; and in a case that the fourth value of the least significant bit LSB is 1, the target association relationship includes: PTRS port 0 is associated with the $2^{nd}$ scheduled DM-RS port associated with the second SRS resource or SRS resource group.

Optionally, in a case that the maximum number of PTRS ports is 1 and the maximum number of transmission ranks is 3 or 4, determining that the number of bits of the indication information in the PTRS-DMRS association field is 4 bits.

Optionally, the second value of the indication information in the PTRS-DMRS association field includes a fifth value of the most significant bit MSB and a sixth value of the least significant bit LSB; and the most significant bit MSB is 2 bits, and the least significant bit LSB is 2 bits.

Optionally, the fifth value of the most significant bit MSB is 0, 1, 2, or 3.

In a case that the fifth value of the most significant bit MSB is 0, the target association relationship includes: PTRS port 0 is associated with the $1^{st}$ scheduled DM-RS port associated with a first SRS resource or SRS resource group;

in a case that the fifth value of the most significant bit MSB is 1, the target association relationship includes: PTRS port 0 is associated with the $2^{nd}$ scheduled DM-RS port associated with the first SRS resource or SRS resource group;

in a case that the fifth value of the most significant bit MSB is 2, the target association relationship includes: PTRS port 0 is associated with the $3^{rd}$ scheduled DM-RS port associated with the first SRS resource or SRS resource group; and in a case that the fifth value of the most significant bit MSB is 3, the target association relationship includes: PTRS port 0 is associated with the 4th scheduled DM-RS port associated with the first SRS resource or SRS resource group.

Optionally, the sixth value of the least significant bit LSB is 0, 1, 2, or 3.

in a case that the sixth value of the least significant bit LSB is 0, the target association relationship includes: TRS port 0 is associated with the $1^{st}$ scheduled DM-RS port associated with a second SRS resource or SRS resource group;

in a case that the sixth value of the least significant bit LSB is 1, the target association relationship includes: TRS port 0 is associated with the $2^{nd}$ scheduled DM-RS port associated with the second SRS resource or SRS resource group;

in a case that the sixth value of the least significant bit LSB is 2, the target association relationship includes: PTRS port 0 is associated with the $3^{rd}$ scheduled DM-RS port associated with the second SRS resource or SRS resource group; and in a case that the sixth value of the least significant bit LSB is 3, the target association relationship includes: PTRS port 0 is associated with the 4th scheduled DM-RS port associated with the second SRS resource or SRS resource group.

Optionally, in a case that the maximum number of PTRS ports is 2 and the maximum number of transmission ranks is 3 or 4, it is determined that the number of bits of the indication information in the PTRS-DMRS association field is 4 bits.

Optionally, the second value of the indication information in the PTRS-DMRS association field includes a seventh value of a first bit, an eighth value of a second bit, a ninth value of a third bit, and a tenth value of a fourth bit.

Optionally, the seventh value of the first bit includes 0 or 1.

In a case that the seventh value of the first bit is 0, the target association relationship includes: shared PTRS port 0 is associated with the $1^{st}$ scheduled DM-RS port associated with a first SRS resource or SRS resource group; and in a case that the seventh value of the first bit is 1, the target association relationship includes: shared PTRS port 0 is associated with the $2^{nd}$ scheduled DM-RS port associated with the first SRS resource or SRS resource group.

Optionally, the eighth value of the second bit includes 0 or 1.

In a case that the eighth value of the second bit is 0, the target association relationship includes: shared PTRS port 1 is associated with the $1^{st}$ scheduled DM-RS port associated with a first SRS resource or SRS resource group; and in a case that the eighth value of the second bit is 1, the target association relationship includes: shared PTRS port 1 is associated with the $2^{nd}$ scheduled DM-RS port associated with the first SRS resource or SRS resource group.

Optionally, the ninth value of the third bit includes 0 or 1.

In a case that the ninth value of the third bit is 0, the target association relationship includes: shared PTRS port 0 is associated with the $1^{st}$ scheduled DM-RS port associated with a second SRS resource or SRS resource group; and in a case that the ninth value of the third bit is 1, the target association relationship includes: shared PTRS port 0 is associated with the $2^{nd}$ scheduled DM-RS port associated with the second SRS resource or SRS resource group.

Optionally, the tenth value of the fourth bit includes 0 or 1.

In a case that the tenth value of the fourth bit is 0, the target association relationship includes: shared PTRS port 1 is associated with the $1^{st}$ scheduled DM-RS port associated with a second SRS resource or SRS resource group; and in a case that the tenth value of the fourth bit is 1, the target association relationship includes: shared PTRS port 1 is associated with the $2^{nd}$ scheduled DM-RS port associated with the second SRS resource or SRS resource group.

Optionally, an association relationship between the TPMI indication information and the first signaling includes:

in a case that all SRI field codepoint information contained in the first signaling is associated with only one SRS resource or SRS resources associated with all the SRI field codepoint information belong to one SRS resource set, the TPMI indication information is in one-to-one correspondence to PUSCH repetition occasions.

In this embodiment of this application, the target transmission resource configuration for PUSCH transmission is indicated to the terminal by using at least one of the SRS resource indication information, the TPMI indication information, and the PTRS transmit port indication information, so as to reduce bit overheads for the SRI field and/or TPMI field for the PUSCH transmission resource configuration.

The network-side device embodiment in the embodiments of this application is a product embodiment corresponding to the foregoing method embodiment, and all the implementations in the foregoing method embodiment are applicable to the network-side device embodiment, with the same or similar technical effects achieved. Details are not repeated herein.

An embodiment of this application further provides a readable storage medium, where a program or an instruction is stored in the readable storage medium. When the program or instruction is executed by a processor, the processes of the foregoing PUSCH transmission method embodiment can be implemented, with same technical effects achieved. To avoid repetition, details are not described herein again.

The processor is a processor in the terminal described in the foregoing embodiments. The readable storage medium includes a computer-readable storage medium, for example, a computer read-only memory (ROM), a random access memory (RAM), a magnetic disk, or an optical disc.

An embodiment of this application further provides a chip, where the chip includes a processor and a communications interface. The communications interface is coupled to the processor, and the processor is configured to run a program or an instruction of a network-side device to implement the processes of the foregoing PUSCH transmission method embodiments, with the same technical effects achieved. To avoid repetition, details are not described herein again.

It should be understood that the chip mentioned in the embodiments of this application may also be referred to as a system-level chip, a system chip, a chip system, a system-on-chip, or the like.

It should be noted that in this specification, the term "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. Furthermore, it should be noted that, in the scope of the method and apparatus in the embodiments of this application, execution of the functions are not limited to the order shown or described, and the functions may alternatively be executed in a substantially simultaneous manner or in a reverse order. For example, the described method may be performed in an order different from that described, and steps may be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this application essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A physical uplink shared channel (PUSCH) transmission method, comprising:

receiving, by a terminal from a network side, signaling of a radio resource control (RRC) layer, the signaling of the RRC layer comprising the maximum number of phase tracking reference signal (PTRS) ports and the maximum number of transmission ranks;

determining, by the terminal based on the maximum number of PTRS ports and the maximum number of transmission ranks, indication information in a phase tracking reference signal-demodulation reference signal (PTRS-DMRS) association field of first indication information;

determining, by the terminal based on the indication information in the PTRS-DMRS association field, a target transmission resource configuration from at least one transmission resource configuration; and performing, by the terminal, PUSCH transmission based on the target transmission resource configuration.

2. The PUSCH transmission method according to claim 1, wherein the determining, by the terminal based on the indication information in the PTRS-DMRS association field, the target transmission resource configuration from at least one transmission resource configuration comprises:

determining, based on the indication information in the PTRS-DMRS association field, a target association relationship in at least one association relationship between PTRS ports and DMRS transmit ports; wherein the DMRS transmit port is associated with a sounding reference signal (SRS) resource or SRS resource group for PUSCH transmission.

3. The PUSCH transmission method according to claim 1, wherein the determining, by the terminal based on the maximum number of PTRS ports and the maximum number of transmission ranks, indication information in a phase tracking reference signal-demodulation reference signal (PTRS-DMRS) association-field of first indication information comprises:

determining, based on the maximum number of PTRS ports and the maximum number of transmission ranks, the number of bits of the indication information in the PTRS-DMRS association field of the first indication information; and determining, based on the number of bits of the indication information in the PTRS-DMRS association field, a value range of the indication information in the PTRS-DMRS association field.

4. The PUSCH transmission method according to claim 3, wherein different values in the value range of the indication information in the PTRS-DMRS association field of the first indication information are in one-to-one correspondence to the at least one association relationship between PTRS ports and DMRS transmit ports.

5. The PUSCH transmission method according to claim 3, wherein the determining, based on the maximum number of PTRS ports and the maximum number of transmission ranks, the number of bits of the indication information in the PTRS-DMRS association field of the first indication information comprises:

in a case that the maximum number of PTRS ports is 1 or 2 and the maximum number of transmission ranks is 2, determining that the number of bits of the indication information in the PTRS-DMRS association field is 2 bits;

in a case that the maximum number of PTRS ports is 1 or 2 and the maximum number of transmission ranks is 3 or 4, determining that the number of bits of the indication information in the PTRS-DMRS association field is 4 bits.

6. The PUSCH transmission method according to claim 5, wherein a value of a most significant bit (MSB) for the indication information in the PTRS-DMRS association field comprises 0 or 1; wherein in a case that the value of the most significant bit (MSB) is 0, the target association relationship comprises: PTRS port 0 is associated with the 1st scheduled DM-RS port associated with a first SRS resource or SRS resource group; and in a case that the value of the most significant bit (MSB) is 1, the target association relationship comprises: PTRS port 0 is associated with the 2nd scheduled DM-RS port associated with the first SRS resource or SRS resource group.

7. The PUSCH transmission method according to claim 5, wherein a value of a least significant bit (LSB) for the indication information in the PTRS-DMRS association field comprises 0 or 1; wherein in a case that the value of the least significant bit (LSB) is 0, the target association relationship comprises: PTRS port 0 is associated with the 1st scheduled DM-RS port associated with a second SRS resource or SRS resource group; and in a case that the value of the least significant bit (LSB) is 1, the target association relationship comprises: PTRS port 0 is associated with the 2nd scheduled DM-RS port associated with the second SRS resource or SRS resource group.

8. The PUSCH transmission method according to claim 3, wherein the determining, based on the maximum number of PTRS ports and the maximum number of transmission ranks, the number of bits of the indication information in the PTRS-DMRS association field of the first indication information comprises:

in a case that the maximum number of PTRS ports is 1 and the maximum number of transmission ranks is 3 or 4, determining that the number of bits of the indication information in the PTRS-DMRS association field is 4 bits.

9. The PUSCH transmission method according to claim 8, wherein a value of a most significant bit (MSB) for the indication information in the PTRS-DMRS association field is 0, 1, 2, or 3; wherein in a case that the value of the most significant bit (MSB) is 0, the target association relationship comprises: PTRS port 0 is associated with the 1st scheduled DM-RS port associated with a first SRS resource or SRS resource group;

in a case that the value of the most significant bit (MSB) is 1, the target association relationship comprises: PTRS port 0 is associated with the 2nd scheduled DM-RS port associated with the first SRS resource or SRS resource group;

in a case that the value of the most significant bit (MSB) is 2, the target association relationship comprises: PTRS port 0 is associated with the 3rd scheduled DM-RS port associated with the first SRS resource or SRS resource group; and in a case that the value of the most significant bit (MSB) is 3, the target association relationship comprises: PTRS port 0 is associated with the 4th scheduled DM-RS port associated with the first SRS resource or SRS resource group.

10. The PUSCH transmission method according to claim 8, wherein a value of a least significant bit (LSB) for the indication information in the PTRS-DMRS association field is 0, 1, 2, or 3; wherein in a case that the value of the least significant bit (LSB) is 0, the target association relationship comprises: TRS port 0 is associated with the 1st scheduled DM-RS port associated with a second SRS resource or SRS resource group;

in a case that the value of the least significant bit (LSB) is 1, the target association relationship comprises: TRS port 0 is associated with the 2nd scheduled DM-RS port associated with the second SRS resource or SRS resource group;

in a case that the value of the least significant bit (LSB) is 2, the target association relationship comprises: PTRS port 0 is associated with the 3rd scheduled DM-RS port associated with the second SRS resource or SRS resource group; and in a case that the value of the least significant bit (LSB) is 3, the target association relationship comprises: PTRS port 0 is associated with the 4th scheduled DM-RS port associated with the second SRS resource or SRS resource group.

11. The PUSCH transmission method according to claim 3, wherein the determining, based on the maximum number of PTRS ports and the maximum number of transmission ranks, the number of bits of the indication information in the PTRS-DMRS association field of the first indication information comprises:

in a case that the maximum number of PTRS ports is 2 and the maximum number of transmission ranks is 3 or 4, determining that the number of bits of the indication information in the PTRS-DMRS association field is 4 bits.

12. The PUSCH transmission method according to claim 11, wherein a value of a first bit of the indication information in the PTRS-DMRS association field comprises 0 or 1; wherein in a case that the value of the first bit is 0, the target association relationship comprises: shared PTRS port 0 is associated with the 1st scheduled DM-RS port associated with a first SRS resource or SRS resource group; and in a case that the value of the first bit is 1, the target association relationship comprises: shared PTRS port 0 is associated with the 2nd scheduled DM-RS port associated with the first SRS resource or SRS resource group.

13. The PUSCH transmission method according to claim 11, wherein a value of a second bit of the indication information in the PTRS-DMRS association field comprises 0 or 1; wherein in a case that the value of the second bit is 0, the target association relationship comprises: shared PTRS port 1 is associated with the 1st scheduled DM-RS port associated with a first SRS resource or SRS resource group; and in a case that the value of the second bit is 1, the target association relationship comprises: shared PTRS port 1 is associated with the 2nd scheduled DM-RS port associated with the first SRS resource or SRS resource group.

14. The PUSCH transmission method according to claim 11, wherein a value of a third bit of the indication information in the PTRS-DMRS association field comprises 0 or 1; wherein in a case that the value of the third bit is 0, the target association relationship comprises: shared PTRS port 0 is associated with the 1st scheduled DM-RS port associated with a second SRS resource or SRS resource group; and in a case that the value of the third bit is 1, the target association relationship comprises: shared PTRS port 0 is associated with the 2nd scheduled DM-RS port associated with the second SRS resource or SRS resource group.

15. The PUSCH transmission method according to claim 11, wherein a value of a fourth bit of the indication information in the PTRS-DMRS association field comprises 0 or 1; wherein in a case that the value of the fourth bit is 0, the target association relationship comprises: shared PTRS port 1 is associated with the 1st scheduled DM-RS port associated with a second SRS resource or SRS resource group; and in a case that the value of the fourth bit is 1, the target association relationship comprises: shared PTRS port 1 is associated with the 2nd scheduled DM-RS port associated with the second SRS resource or SRS resource group.

16. The PUSCH transmission method according to claim 1, wherein the first indication information further comprises at least one of the following:

SRS resource indication information; or precoding matrix indicator (TPMI) indication information.

17. The PUSCH transmission method according to claim 16, wherein the SRS resource indication information comprises a codepoint value in an SRI field; and the determining, by a terminal based on first indication information that is received, a target transmission resource configuration indicated by the first indication information from at least one transmission resource configuration comprises:

determining, based on the codepoint value in the SRI field of DCI, target SRI field codepoint information in at least one piece of SRI field codepoint information; wherein the SRI field codepoint information is associated with at least one SRS resource, or the SRI field codepoint information is associated with at least one SRS resource group.

18. The PUSCH transmission method according to claim 1, wherein in a case that the first indication information comprises TPMI indication information, performing PUSCH transmission based on the target transmission resource configuration comprises:

performing transmission based on a first transmission mode or a second transmission mode by using one or more target TPMIs indicated by the TPMI indication information;

wherein the first transmission mode comprises:

a first TPMI in the one or more target TPMIs is used for transmission for all PUSCH transmission occasions associated with different SRS resources or SRS resource groups;

wherein the first TPMI is determined based on the TPMI indication information; wherein the TPMI indication information comprises:

TPMI field related information in DCI; and/or signaling sent by an RRC layer or a MAC layer;

wherein the second transmission mode comprises:

different TPMIs in the one or more target TPMIs are used for transmission for PUSCH transmission occasions associated with different SRS resources or SRS resource groups; wherein the SRS resources or SRS resource groups associated with the PUSCH transmission occasions are in one-to-one correspondence to the TPMIs used for the PUSCH transmission occasions; or the TPMIs used for the PUSCH transmission occasions associated with different SRS resources or SRS resource groups are determined based on the TPMI indication information; wherein the TPMI indication information comprises:

TPMI field related information in DCI; and/or signaling sent by an RRC layer or a MAC layer.

19. A physical uplink shared channel (PUSCH) transmission method, comprising:

sending, by a network side, signaling of a radio resource control (RRC) layer to a terminal, the signaling of the RRC layer comprising the maximum number of phase tracking reference signal-demodulation reference signal (PTRS) ports and the maximum number of transmission ranks; and sending, by the network side, first indication information to the terminal, the first indication information comprising indication information in a phase tracking reference signal-demodulation reference signal (PTRS-DMRS) association field;

wherein the maximum number of PTRS ports and the maximum number of transmission ranks is used to determine the indication information in the PTRS-DMRS association field, and the indication information in the PTRS-DMRS association field is used to determine a target transmission resource configuration for PUSCH transmission.

20. A communications device, comprising a processor, a memory, and instructions stored in the memory and capable of running on the processor, wherein, in a case that the communications device is a terminal, the instructions, when being executed by the processor, implements:

receiving, from a network side, signaling of a radio resource control (RRC) layer, the signaling of the RRC layer comprising the maximum number of phase tracking reference signal (PTRS) ports and the maximum number of transmission ranks;

determining, based on the maximum number of PTRS ports and the maximum number of transmission ranks, indication information in a phase tracking reference signal-demodulation reference signal (PTRS-DMRS) association field of first indication information;

determining, based on the indication information in the PTRS-DMRS association field, a target transmission resource configuration from at least one transmission resource configuration; and performing PUSCH transmission based on the target transmission resource configuration;

in a case that the communications device is a network side device, the instructions, when being executed by the processor, implements:

sending signaling of a radio resource control (RRC) layer to a terminal, the signaling of the RRC layer comprising the maximum number of phase tracking reference signal (PTRS) ports and the maximum number of transmission ranks; and sending first indication information to the terminal, the first indication information comprising indication information in a phase tracking reference signal-demodulation reference signal (PTRS-DMRS) association field;

wherein the maximum number of PTRS ports and the maximum number of transmission ranks is used to determine the indication information in the PTRS-DMRS association field, and the indication information in the PTRS-DMRS association field is used to determine a target transmission resource configuration for PUSCH transmission.

* * * * *